(12) United States Patent
Hawaka et al.

(10) Patent No.: US 11,425,644 B2
(45) Date of Patent: Aug. 23, 2022

(54) INFORMATION PROCESSING APPARATUS AND CONTROL METHOD

(71) Applicant: LENOVO (Singapore) PTE. LTD., New Tech Park (SG)

(72) Inventors: Shigekazu Hawaka, Yokohama (JP); Jun Ishihara, Yokohama (JP); Ke Ma, Yokohama (JP)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 61 days.

(21) Appl. No.: 16/894,578

(22) Filed: Jun. 5, 2020

(65) Prior Publication Data

US 2020/0389845 A1    Dec. 10, 2020

(30) Foreign Application Priority Data

Jun. 5, 2019 (JP) .............................. JP2019-105000

(51) Int. Cl.
  *H04W 52/02* (2009.01)
  *H04B 7/0426* (2017.01)
  *H04W 84/18* (2009.01)
  *H04W 84/12* (2009.01)

(52) U.S. Cl.
  CPC ...... *H04W 52/0203* (2013.01); *H04B 7/0426* (2013.01); *H04W 84/12* (2013.01); *H04W 84/18* (2013.01)

(58) Field of Classification Search
  CPC ............ H04B 7/0426; H04M 2250/12; H04W 52/0203; H04W 84/12; H04W 84/18; H04W 88/02; Y02D 30/70
  See application file for complete search history.

(56) References Cited

U.S. PATENT DOCUMENTS

| 2010/0306564 A1* | 12/2010 | Kojo ..................... G06F 1/3218 713/323 |
| 2011/0320405 A1* | 12/2011 | Hsu ....................... G06F 1/3218 707/634 |
| 2012/0229371 A1* | 9/2012 | Sip ........................... G09G 3/20 345/156 |

(Continued)

FOREIGN PATENT DOCUMENTS

| JP | 2001244843 A | 9/2001 |
| JP | 2013255156 A | 12/2013 |
| JP | 2018061155 A | 4/2018 |

*Primary Examiner* — Khaled M Kassim
*Assistant Examiner* — Kai Chang
(74) *Attorney, Agent, or Firm* — Kunzler Bean & Adamson

(57) ABSTRACT

Apparatuses, methods, and systems are disclosed herein to provide an information processing apparatus and a control method which do not cause a reduction in the output of radio waves when a human body is not approaching. A communication unit communicates with other devices wirelessly, a detection unit detects a physical quantity varying with the approach of an object, and a control unit causes the communication unit to reduce the output of radio waves when the amount of change in physical quantity exceeds a predetermined threshold value. When a predetermined member is in a position to approach a first chassis on which the communication unit and the detection unit are mounted, the control unit compensates for a change in physical quantity detected by the detection unit due to the approach of the member.

20 Claims, 11 Drawing Sheets

(56) References Cited

U.S. PATENT DOCUMENTS

| | | |
|---|---|---|
| 2016/0149597 A1 | 5/2016 | Takasu |
| 2017/0125900 A1* | 5/2017 | Xu .......................... H01Q 1/243 |
| 2018/0124514 A1* | 5/2018 | Peeler ...................... H04R 3/04 |
| 2019/0215765 A1* | 7/2019 | Ramasamy .......... H04W 52/243 |
| 2019/0281597 A1* | 9/2019 | Ramasamy .......... H04B 7/0695 |
| 2020/0110451 A1* | 4/2020 | He ........................ G06F 1/3215 |

* cited by examiner

215a

| ANGLE RANGE | ENTRY ANGLE | EXIT ANGLE | ADJUSTMENT RANGE UPPER LIMIT | ADJUSTMENT RANGE LOWER LIMIT | RETENTION TIME ms |
|---|---|---|---|---|---|
| 0 | 0 | 0 | - | - | 250 |
| 1 | 1 | 20 | 10 | 1 | 250 |
| 2 | 21 | 134 | 10 | 1 | 250 |
| 3 | 135 | 171 | 10 | 1 | 250 |
| 4 | 172 | 189 | 5 | 8 | 250 |
| 5 | 190 | 359 | 10 | 10 | 250 |
| 6 | 1 | 89 | 10 | 1 | 250 |
| 7 | 90 | 359 | 10 | 10 | 250 |
| 8 | 360 | 360 | - | - | 250 |

215b

| ANGLE RANGE | TOUCH SCREEN DIRECTION/USE MODE | | | | ROTATION DIRECTION/SCREEN CONTROL | | BOOK MODE SCREEN CONTROL |
|---|---|---|---|---|---|---|---|
| | 101a | 101b | 101c | 101d | OPENING DIRECTION | CLOSING DIRECTION | |
| 0 | CLOSED | CLOSED | CLOSED | CLOSED | - | - | - |
| 1 | LAPTOP | - | LAPTOP | - | DISPLAY | NON-DISPLAY | - |
| 2 | LAPTOP | - | LAPTOP | - | - | - | - |
| 3 | LAPTOP | - | LAPTOP | - | - | - | - |
| 4 | LAPTOP | - | LAPTOP | - | REVERSE | NORMAL DISPLAY | - |
| 5 | STAND | - | TENT | - | - | - | - |
| 6 | - | BOOK | - | BOOK | - | - | LOCK |
| 7 | - | BOOK | - | BOOK | - | - | - |
| 8 | TABLET | TABLET | TABLET | TABLET | - | - | ROTATION |

FIG. 12

| | |
|---|---|
| OPENING/CLOSING ANGLE | 0°-360° |
| ANGLE RANGE | 0-8 |
| TOUCH SCREEN DIRECTION | 101a-101d |
| USE MODE | C/L/Te/S/Tb/B |
| ROTATION DIRECTION | OPENING DIRECTION/ CLOSING DIRECTION |

INFORMATION PROCESSING APPARATUS AND CONTROL METHOD

FIELD

The present invention relates to an information processing apparatus and a control method.

BACKGROUND

Information processing apparatuses such as personal computers (PCs) commonly include communication modules used to perform wireless communication. Among the communication modules, there is a communication module capable of directly connecting to a wireless wide area network (WWAN). The WWAN is typically a public land mobile network (PLMN) provided by a wireless carrier. The WWAN is deployed to include a plurality of base stations at geographically different positions in order to cover a service area in which a communication service is provided. In the communication using the WWAN, it is necessary to increase the output of radio waves to the communication module more than that in a wireless local area network (WLAN). Therefore, for PCs having WWAN compatible communication modules (hereinafter called WWAN modules), it is stipulated in the standards, such as the FCC (Federal Communications Commission) rules and the EU (European Union) product rules, that a DPR (Dynamic Power Reduction) function should be implemented not to exceed a predetermined SAR (Specific Absorption Rate) reference value.

The SAR means the amount of energy absorbed in a unit time per mass of tissue in a human body when exposed to radio waves. The DPR function is a function to reduce the output of radio waves in cooperation with a proximity sensor when the human body approaches a WWAN antenna. The proximity sensor is commonly placed in a position sufficiently close to the WWAN antenna, for example, in an adjacent position.

BRIEF SUMMARY

The DPR function may be provided in an apparatus having a mechanism provided on one side faces of two chassis to make these chassis openable and closable relative to each other about the axis thereof such as a so-called laptop PC. The angle of two chassis to face each other is made variable between 0° to 360°, and the apparatus may operate in a state where the two chassis are folded up in directions opposite to each other (a tablet mode to be described later). In this case, one chassis (for example, A cover) approaches a proximity sensor installed on the other chassis (for example, C cover). Therefore, the proximity sensor may detect the approach of a human body despite the fact that the human body does not approach the proximity sensor. This causes a problem that the DPR function is activated to reduce output from the WWAN module unnecessarily (Power Back-off).

The present invention has been made to solve the above problem, and an information processing apparatus according to the first aspect of the present invention includes: a communication unit which communicates with other devices wirelessly; a detection unit which detects a physical quantity varying with the approach of an object; a control unit which causes the communication unit to reduce the output of radio waves when the amount of change in physical quantity exceeds a predetermined threshold value; a first chassis on which the communication unit and the detection unit are mounted; and a predetermined member placed at least in either a position to approach the first chassis or a position to separate from the first chassis, wherein when the member is in the position to approach the first chassis, the control unit compensates for a change in physical quantity detected by the detection unit due to the approach of the member.

The above information processing apparatus may be such that the detection unit detects the capacitance of a capacitor as the physical quantity, the amount of change in the capacitance caused to the detection unit by the member when the member is in the position to approach the first chassis is obtained in advance, the control unit corrects the threshold value with the amount of change in the capacitance when the member is in the position to approach the first chassis, and the control unit cancels the correction when the member is in the position to separate from the first chassis.

The above information processing apparatus may be such that the member is a second chassis different from the first chassis, and the information processing apparatus further includes a rotating mechanism which makes the first chassis rotatable with respect to the second chassis while coupling the first chassis and the second chassis, whereby, based on an angle between the first chassis and the second chassis, the control unit determines whether the position of the second chassis is the position to approach the first chassis or the position to separate from the first chassis.

The above information processing apparatus may further include: a display unit which displays visual information on the surface of one of the first chassis and the second chassis; and an operation input unit provided on the other of the first chassis and the second chassis to accept operations, wherein the control unit determines that the second chassis is in the position to approach the first chassis only when the direction of the display unit is a direction opposite to the direction of the operation input unit.

In the above information processing apparatus, the communication unit may be communicable with other devices via a public wireless communication network.

A control method according to the second aspect of the present invention is a control method for an information processing apparatus including: a communication unit which communicates with other devices wirelessly; and a detection unit which detects a physical quantity varying with the approach of an object, the control method causing the information processing apparatus to execute: a first step of causing the communication unit to reduce the output of radio waves when the amount of change in physical quantity exceeds a predetermined threshold value; and a second step in which, when a predetermined member placed at least in either a position to approach a first chassis, on which the communication unit and the detection unit are mounted, or a position to separate from the first chassis is placed in the position to approach the first chassis, a change in physical quantity detected by the detection unit due to the approach of the member is compensated for.

The above-described aspects of the present invention do not cause a reduction in the output of radio waves when a human body is not approaching.

BRIEF DESCRIPTION OF THE DRAWINGS

A more particular description of the embodiments briefly described above will be rendered by reference to specific embodiments that are illustrated in the appended drawings.

Understanding that these drawings depict only some embodiments and are not therefore to be considered to be limiting of scope, the embodiments will be described and explained with additional specificity and detail through the use of the accompanying drawings, in which:

FIG. 12 is a table illustrating an example of a control table according to the embodiment;

DETAILED DESCRIPTION

Figure 1:
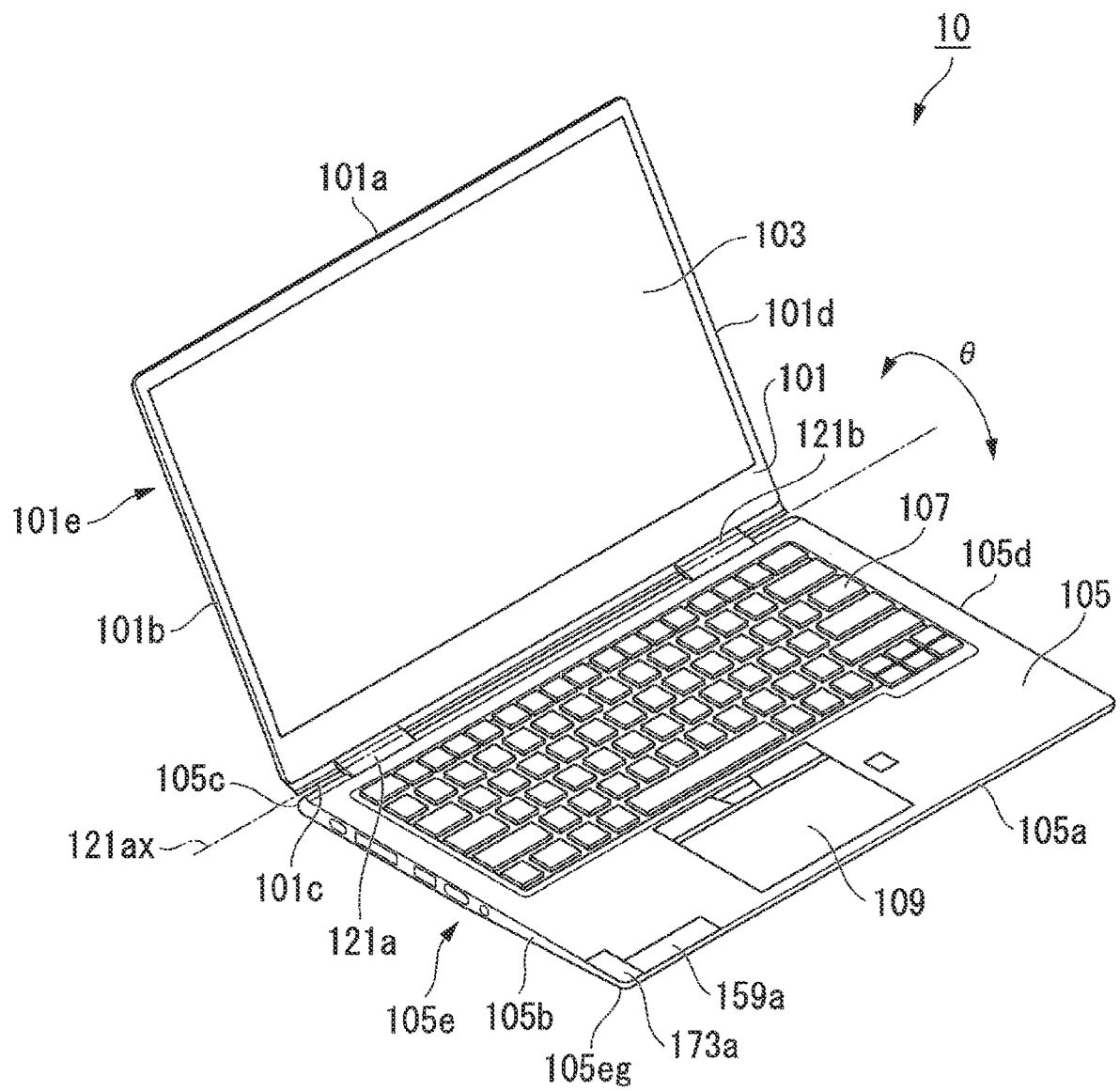
FIG. 1 is a perspective view illustrating the external appearance of an information processing apparatus according to an embodiment.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be written in any combination of one or more programming languages including an object oriented programming language such as Python, Ruby, R, Java, Java Script, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The embodiments may transmit data between electronic devices. The embodiments may further convert the data from a first format to a second format, including converting the data from a non-standard format to a standard format and/or converting the data from the standard format to a non-standard format. The embodiments may modify, update, and/or process the data. The embodiments may store the received, converted, modified, updated, and/or processed data. The embodiments may provide remote access to the data including the updated data. The embodiments may make the data and/or updated data available in real time. The embodiments may generate and transmit a message based on the data and/or updated data in real time.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

First, the outline of an information processing apparatus 10 according to the embodiment of the present invention will be described. In the following, a case where the information processing apparatus 10 is a laptop PC will be mainly described. However, the information processing apparatus 10 is not necessarily limited to the laptop PC, and it may be a smartphone or the like.

FIG. 1 is a perspective view illustrating the external appearance of the information processing apparatus 10 according to the embodiment.

The information processing apparatus 10 is such that a first chassis 101 is rotatable with respect to a second chassis 105, and use modes are switchable according to the angle between the surface of the first chassis 101 and the surface of the second chassis 105 (hereinafter called the opening/closing angle). The information processing apparatus 10 determines a use mode based on the opening/closing angle.

One side face of the first chassis 101 and one side face of the second chassis 105 are coupled through hinge mechanisms 121a, 121b, respectively. The first chassis 101 has side faces 101a to 101d and a back face 101e. The first chassis 101 is internally formed into a box shape and a touch screen 103 is mounted thereon. Under this position, a user can perform touch operations on the surface of the touch screen 103 while viewing various kinds of information on the touch screen 103.

The second chassis 105 has side faces 105a to 105d and a back face 105e. Various kinds of elements including a system device SD (FIG. 2) are mounted inside the second chassis 105. Further, a keyboard 107 and a touch pad 109 are mounted on the surface of the second chassis 105.

Inside an edge frame along the side face 101a of the first chassis 101, elements such as a microphone, a speaker, a camera, an acceleration sensor 175a (FIG. 2), and a Hall sensor 179 (FIG. 2) are mounted. A detection element 173a is mounted in a portion where the side faces 105a, 105b of the second chassis 105 are sandwiched through a ridge line (edge) 105eg. The detection element 173a is used to detect the approach of a person. An antenna 159a is mounted in a position adjacent to the detection element 173a inside the edge frame along the side face 105a. The antenna 159a is used to establish a connection to a communication network such as WWAN or WLAN so that various kinds of data can be transmitted and received wirelessly. Further, elements including an acceleration sensor 175b (FIG. 2) is mounted inside the edge frame along the side face 105a of the second chassis 105. In the example illustrated in FIG. 1, a proximity sensor 173, the detection element 173a, a communication module 159, and the antenna 159a are mounted in the second chassis 105, but these elements may also be installed in the first chassis 101 instead of the second chassis 105.

Hinge mechanisms 121a, 121b are attached along the side faces 101c, 105c in such a manner that the first chassis 101 is rotatable relative to the second chassis 105 around an axis of rotation 121ax parallel to the side faces 101c, 105c. The angle between the surface of the first chassis 101 and the surface of the second chassis 105 is called an opening/closing angle θ below. The hinge mechanisms 121a, 121b can rotate the first chassis 101 in a range of opening/closing angles θ from 0° to 360° and can maintain any opening/closing angle θ even when some torque is applied.

In such a structure, when the first chassis 101 is closed to the second chassis 105 (θ=0°), or when the first chassis 101 is turned over with respect to the second chassis 105 (θ=360°), the detection element 173a approaches the surface of the first chassis 101.

Figure 2:
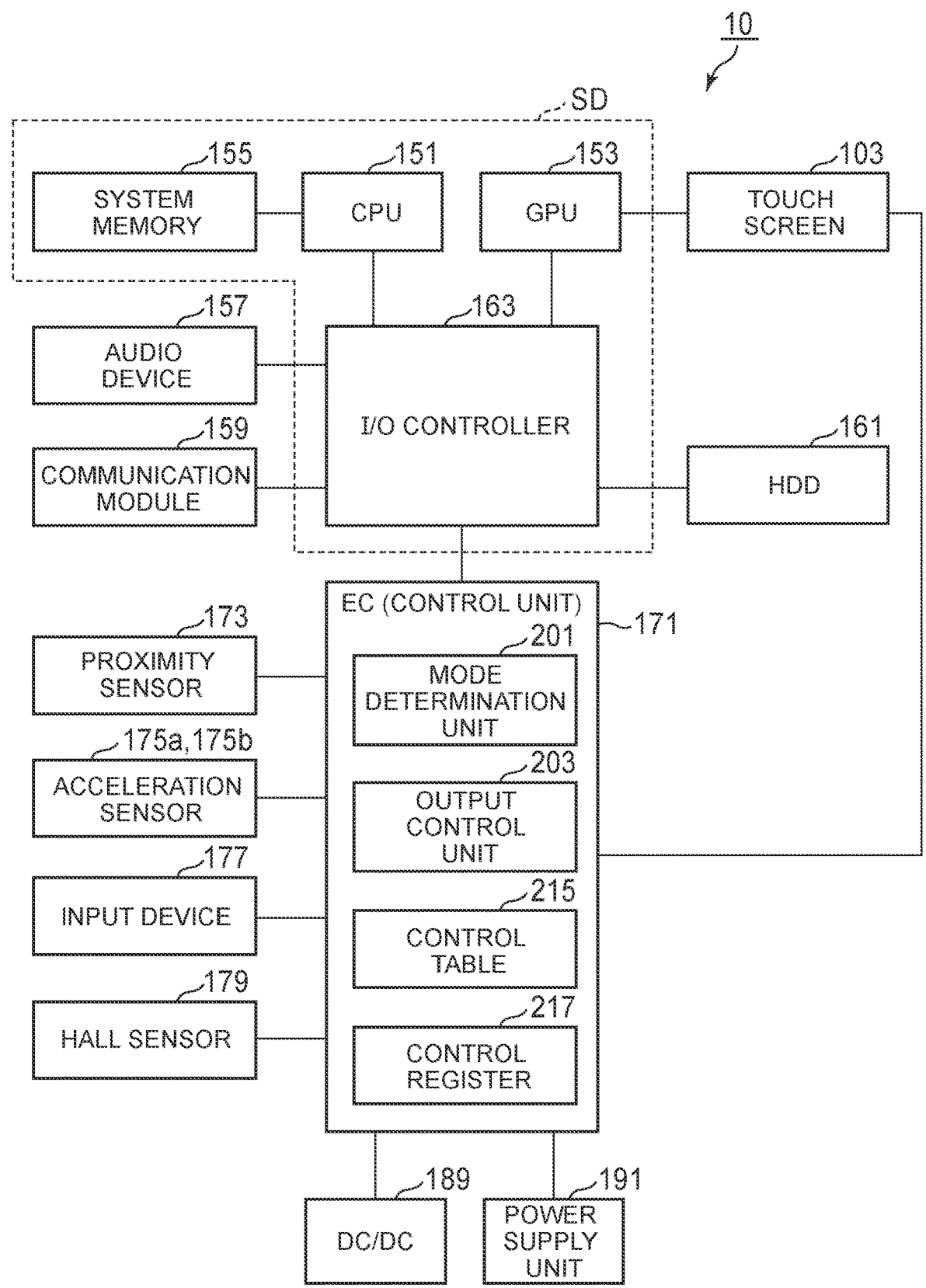
FIG. 2 is a block diagram illustrating a functional configuration example of the information processing apparatus according to the embodiment.

FIG. 2 is a block diagram illustrating a functional configuration example of the information processing apparatus 10 according to the embodiment. The information processing apparatus 10 is configured to include the system device SD and an EC (Embedded Controller) 171.

The system device SD includes a CPU (Central Processing Unit) 151, a GPU (Graphics Processing Unit) 153, a system memory 155, and an I/O (Input/Output) controller 163. The CPU 151, the GPU 153, an audio device 157, a communication module 159, an HDD (Hard-disk Drive) 161, and the EC 171 are connected to the I/O controller 163.

The system memory 155 is connected to the CPU 151, and a display that constitutes the touch screen 103 is connected to the GPU 153. The CPU 151 and the GPU 153 may be collectively called a processor below. The audio device 157 includes the microphone and the speaker described above. The communication module 159 is connected to the antenna 159a described above. The touch screen 103 has such a structure that a transparent touch sensor is laminated on the display.

The EC 171 is a microcomputer composed of a CPU, a ROM (Read-only Memory), a RAM (Random Access memory), a programmable logic circuit, and the like independently of the system device SD. The EC 171 operates independently of the CPU 151 and functions as a control unit which mainly manages an operating environment inside the information processing apparatus 10. The EC 171 reads a control program (firmware) prestored in the ROM and executes processes instructed by various commands described in the read control program to implement functions to be illustrated below. In the following description, the execution of processes instructed by commands described in various programs (regardless of the types of programs, such as application programs (apps below) and an OS (Operating System)) may be called "execute a program(s)" or "execution of a program(s)."

The EC 171 determines the use mode of the information processing apparatus 10 in a manner to be described later to control the operation of each device of the information processing apparatus 10 according to the determined use mode. The control of this device may be called use mode control below. The use mode control includes, for example, screen control.

The EC 171 includes, as functions thereof, a mode determination unit 201, an output control unit 203, a control table 215, and a control register 217.

The mode determination unit 201 detects the opening/closing angle θ as the angle between the first chassis 101 and the second chassis 105 based on acceleration signals input from the acceleration sensors 175a, 175b, respectively, and determines a use mode corresponding to the detected opening/closing angle θ. The mode determination unit 201 performs use mode control according to the determined use mode. Examples of use modes will be described later.

The output control unit 203 monitors a physical quantity detected by the proximity sensor 173, and when the amount of change in physical quantity exceeds a predetermined detection threshold value, the output of radio waves from the antenna 159a to the communication module 159 is more reduced than when the amount of change in physical quantity does not exceed the detection threshold value. The output control unit 203 compensates for a change in physical quantity due to the approach of the first chassis 101 to the detection element 173a to control output to the communication module 159. Upon compensating for the change in physical quantity, the output control unit 203 uses a detection threshold value 2 obtained by adding, to a detection threshold value 1 as a reference detection threshold value, the amount of change in physical quantity as a correction amount due to the approach of the first chassis 101 to the detection element 173a. As a parameter, the opening/closing angle θ can be used to indicate the degree of approach of the first chassis 101 to the detection element 173a. For example, when the opening/closing angle θ is 360°, the output control unit 203 uses the detection threshold value 2 different from the detection threshold value 1. The detection threshold value 1 is a detection threshold value to be applied when the opening/closing angle θ becomes out of a predetermined range from 360°. An example of processing by the output control unit 203 will be described later.

The control table 215 is data used for use mode determination and use mode control. The control table 215 is prestored in a nonvolatile memory such as a ROM. An example of the control table 215 will be described later.

Figures 13, 14:
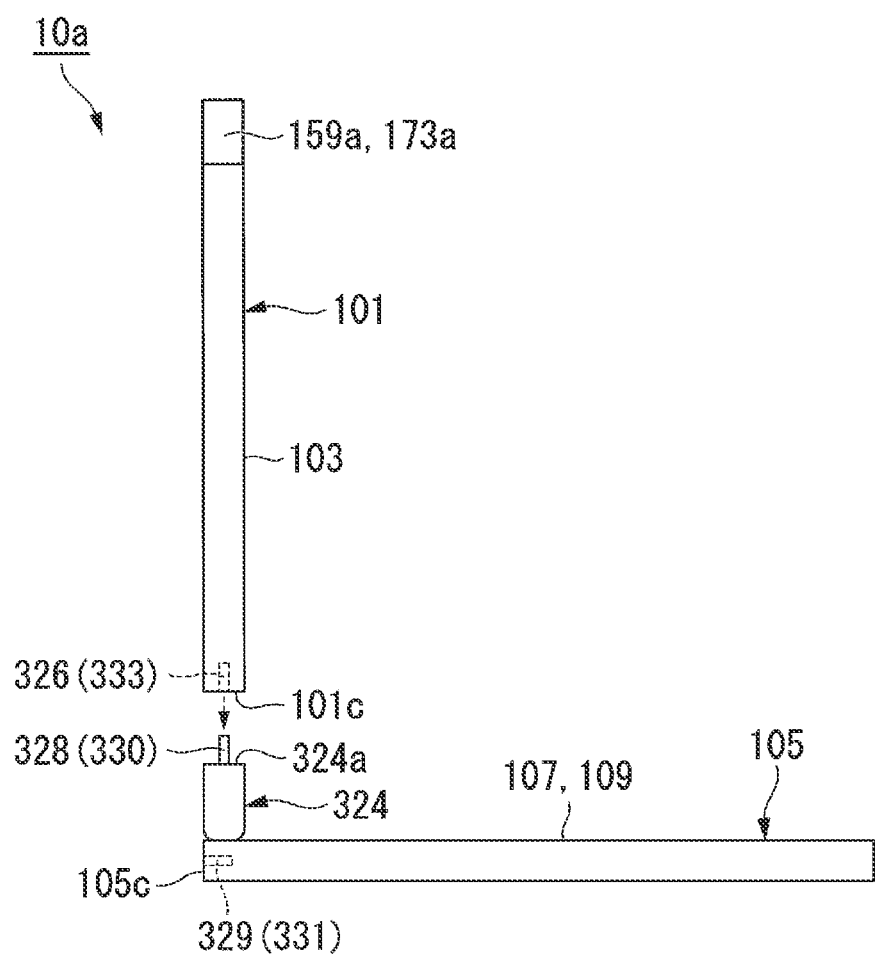
FIG. 13 is a table illustrating an example of a control register according to the embodiment.
FIG. 14 is a diagram illustrating another structure example of an information processing apparatus according to the embodiment.

The control register 217 temporarily stores data acquired or calculated for use mode determination and use mode control. The mode determination unit 201 acquires the opening/closing angle θ from the direction of gravitational acceleration detected, for example, by the acceleration sensors 175a, 175b, respectively, and stores, in the control register 217, an angle range specified by using the acquired opening/closing angle θ and the control table 215. The mode determination unit 201 may detect a touch screen direction (to be described later) using the direction of gravitational acceleration and store the detected touch screen direction in the control register 217. The mode determination unit 201 refers to the control table 215, specifies a use mode based on the angle range and the touch screen direction stored in the control register 217, and stores the specified use mode in the control register 217. Note that the mode determination unit 201 may track a time change in the acquired opening/closing angle θ every predetermined time, and store, in the control register 217, data indicative of the direction of rotation. As illustrated in FIG. 13, respective pieces of information on the opening/closing angle θ, the angle range, the touch screen direction, the use mode, and the direction of rotation are stored in the control register 217 as element information. C, L, Te, S, Tb, and B in FIG. 13 are initials respectively indicative of a closed mode, a laptop mode, a tent mode, a stand mode, a tablet mode, and a book mode as use mode candidates (to be described later).

The mode determination unit 201 acquires information on the opening/closing angle θ and the direction of rotation in predetermined sampling cycles, and updates data stored in the control register 217 each time new information is acquired.

The proximity sensor 173, the acceleration sensors 175a, 175b, an input device 177, the Hall sensor 179, a touch panel that constitutes the touch screen 103, a signal line of a DC/DC converter 189, and a signal line of a power supply unit 191 are connected to the EC 171. The keyboard 107 and the touch pad 109 described above are included in the input device 177.

The proximity sensor 173 uses the detection element 173a to detect a physical quantity variable according to the approach of an object to the own unit. The proximity sensor 173 is, for example, a capacitive sensor. The capacitive sensor detects the capacitance of the detection element 173a as the physical quantity. The proximity sensor 173 outputs, to the EC 171, a detection signal indicative of the detected physical quantity.

The acceleration sensors 175a, 175b are three-axis acceleration sensors respectively having three detection axes orthogonal to one another. The acceleration sensors 175a, 175b are installed in the first chassis 101 and the second chassis 105, respectively. Therefore, the positional relationship between the detection axes of the acceleration sensor 175a and the first chassis 101, and the positional relationship between the detection axes of the acceleration sensor 175b and the second chassis 105 are fixed, respectively. Based on the direction of a gravity component of acceleration (hereinafter, a gravity component a) detected by the acceleration sensor 175a and the direction of a gravity component of acceleration (hereinafter, a gravity component b) detected by the acceleration sensor 175b, the mode determination unit 201 of the EC 171 can calculate the opening/closing angle θ. For example, the mode determination unit 201 may determine a weighted time average of acceleration detected by the time point to be the gravity component. In the weighted time average, a weighting factor is set to increase acceleration components close in time to each other by the time point. The mode determination unit 201 can calculate the opening/closing angle θ from a cosine value obtained by dividing the inner product of the gravity component a and the gravity component b by the respective absolute values of the gravity component a and the gravity component b. However, the method of detecting the opening/closing angle θ is not limited thereto. For example, an angle sensor may be employed instead of the acceleration sensors 175a, 175b and the Hall sensor 179. The angle sensor may detect the rotation angle of the hinge mechanisms 121a, 121b so that the mode determination unit 201 will determine the opening/closing angle θ based on the detected rotation angle.

Further, the mode determination unit 201 can determine which side face among the side faces 101a to 101d of the first chassis 101 faces in a relatively more upward direction than the other side faces from the direction of the gravity component of acceleration detected by the acceleration sensor 175a. The upward direction is a direction opposite to a vertically downward direction (i.e., opposite to the direction of gravity). In the following, the side face facing in the relatively upward direction as an orientation indicator of the first chassis 101 with the touch screen 103 thereon can be used as a touch screen direction. As will be described later, the mode determination unit 201 determines a use mode based on the opening/closing angle θ and the touch screen direction.

The Hall sensor 179 detects an ambient magnetic field. A permanent magnet (not illustrated) is installed in the second chassis 105 at a position opposed to the Hall sensor 179 in such a state that the second chassis 105 is closed to the first chassis 101. Based on the strength of the magnetic field detected by the Hall sensor 179, the mode determination unit 201 can identify whether the opening/closing angle θ is 0° or 360°. More specifically, when the detected magnetic strength is a predetermined strength threshold value or more, the mode determination unit 201 can determine that the opening/closing angle θ is 0°, while when the detected magnetic strength is less than the predetermined strength threshold value, the mode determination unit 201 can determine that the opening/closing angle θ is 360°.

The DC/DC (Direct Current) converter 189 supplies power required for the operation of each of the elements that constitute the information processing apparatus 10.

The DC/DC converter 189 operates according to the instructions from the EC 171 to supply power of a predetermined voltage to each device included in the information processing apparatus 10. For example, when the boot of the information processing apparatus 10 is instructed by a boot switch (not illustrated), the EC 171 starts the supply of power of the predetermined voltage to each device. After that, the EC 171 starts the boot of each device. When receiving a ready event from the system upon stopping the operating state of the system device SD or making a transition to a sleep state, the EC 171 instructs the DC/DC converter 189 to stop the supply of power to a predetermined device. According to the instruction from the EC 171, the DC/DC converter 189 stops the supply of power to the predetermined device.

Note, however, that the DC/DC converter 189 can supply power to the EC 171 and each device required to execute use mode control by the EC 171 regardless of whether the operating state of the system device SD is the stopped state or the sleep state.

(Output Control Example)

Next, an example of output control of the communication module 159 by the output control unit 203 will be described.

Figure 3:
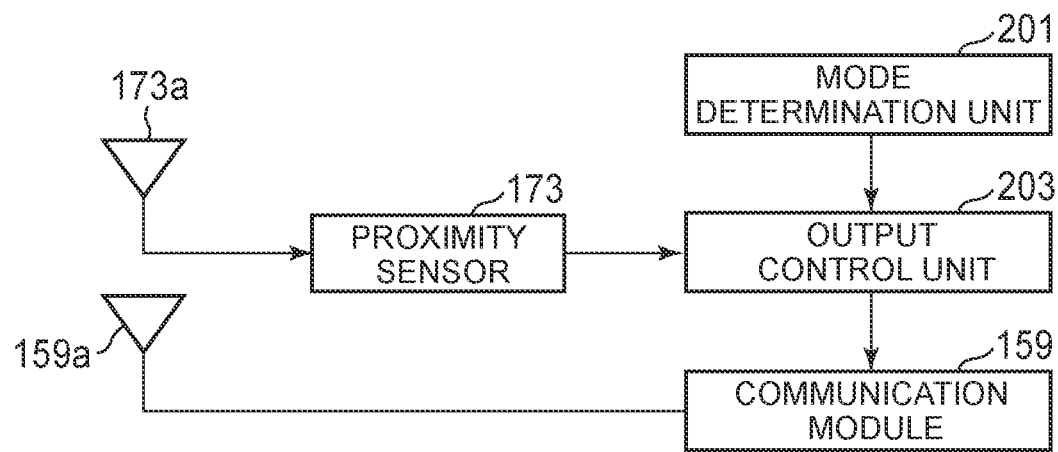
FIG. 3 is a schematic block diagram for describing an example of output control according to the embodiment.

FIG. 3 is a schematic block diagram for describing an output control example according to the embodiment.

The proximity sensor 173 uses the detection element 173*a* as a probe to detect the physical quantity variable according to the approach of an object. For example, the proximity sensor 173 detects the capacitance of the detection element 173*a* as the physical quantity to be detected. The proximity sensor 173 outputs, to the output control unit 203 of the EC 171, a detection signal indicative of the detected physical quantity.

The mode determination unit 201 of the EC 171 determines a use mode of the information processing apparatus 10, and outputs, to the output control unit 203, a use mode signal indicative of the determined use mode. The mode determination unit 201 uses the acceleration signals input from the acceleration sensors 175*a*, 175*b* to determine whether the use mode is, for example, a closed mode, a laptop mode, a tent mode, a stand mode, a tablet mode, or a book mode. As will be described later, the positional relationship between the first chassis 101 and the second chassis 105 with the detection element 173*a* placed thereon is different depending on the use mode. Among them, when the use mode is the tablet mode or the closed mode, the distance between the first chassis 101 and the detection element 173*a* is smaller than those in the other use modes. Thus, the use mode can be used as a factor of the distance between the first chassis 101 and the detection element 173*a*. Note that it is not necessary for the information processing apparatus 10 to reduce the output of radio waves in the closed mode. Further, in the closed mode, the information processing apparatus 10 may not work and hence stop the functions. In this case, the communication module 159 is not used.

The output control unit 203 refers to the physical quantity indicated by the detection signal input from the proximity sensor 173, and the use mode indicated by the use mode signal input from the mode determination unit 201 to determine a detection threshold value for the amount of change in physical quantity from a reference value when no human body is approaching.

For example, when the use mode is a use mode other than the tablet mode (hereinafter a non-tablet mode), the output control unit 203 determines the detection threshold value to be the detection threshold value 1. The tablet mode is a use mode in which the opening/closing angle θ is 360°. The detection threshold value 1 may be a value between 0 and a difference between a physical quantity (hereinafter a reference proximity value), observed when a human body is in proximity within a range of predetermined first distances (hereinafter distance 1, for example, 30 cm to 80 cm) from the detection element 173*a* in a case where the opening/closing angle θ is out of a range of predetermined opening/closing angles θ (for example, θ is in a range of 60° to 300°), and a physical quantity (reference value) observed when the human body is separated from the detection element 173*a* in a range of predetermined second distances (hereinafter distance 2, for example, 1 m to 3 m or more). This range of opening/closing angles θ corresponds to a range in which the first chassis 101 is located in a range of predetermined distances (hereinafter distance 3, for example, 10 cm to 20 cm) from the detection element 173*a*, that is, a range in which the first chassis 101 can be determined to be sufficiently separated from the detection element 173*a*. The distance 1 corresponds to a range in which the human body can be determined to be in proximity to the detection element 173*a*. The distance 2 corresponds to a range in which the human body can be determined to be separated sufficiently from the detection element 173*a*.

On the other hand, when the use mode is the tablet mode, the output control unit 203 determines the detection threshold value for the physical quantity to be the detection threshold value 2. As the detection threshold value 2, a value obtained by adding a correction amount (hereinafter also called a correction value) to the detection threshold value 1 is preset. The correction amount may be a difference in reference value from the physical quantity observed when the human body is separated from the detection element 173*a* in the range of the distance 2, for example, in the case where the opening/closing angle θ is 360°. This correction amount corresponds to the amount of change in physical quantity caused by the proximity of the first chassis 101 to the detection element 173*a*.

The output control unit 203 determines whether the amount of change from the reference value for the physical quantity indicated by the detection signal input from the proximity sensor 173 exceeds the determined detection threshold value or not. When the amount of change exceeds the detection threshold value, the output control unit 203 outputs, to the communication module 159, an output reduction control signal indicative of a reduction in output of radio waves. When the output reduction control signal is input from the output control unit 203, the communication module 159 reduces the output of a transmission signal to be supplied from the own unit to the antenna 159*a*. Upon reducing the output, the communication module 159 limits the output reduction so as not to exceed a predetermined limited intensity lower than an upper limit at which the intensity of the transmission signal is acceptable in the specifications.

The limited intensity typically takes a value lower by 6 to 10 dB than the upper limit. When the amount of change no longer exceeds the detection threshold value, the output control unit 203 outputs, to the communication module 159, an output reduction cancellation control signal indicative of the cancellation of the reduction in output of radio waves. When the output reduction cancellation control signal is input from the output control unit 203, the communication module 159 ends the output reduction in the intensity of the transmission signal to be supplied from the own unit to the antenna 159*a*. When the output reduction is not performed, the communication module 159 controls the intensity of the transmission signal to fall within the range up to the upper limit at which the intensity is acceptable in the specifications. The antenna 159*a* emits radio waves having an electric field strength proportional to the intensity of the transmission signal supplied from the communication module 159. Thus, the electric field strength of radio waves emitted by the output reduction is limited within a range of the electric field strength corresponding to the limited intensity.

Figure 4:
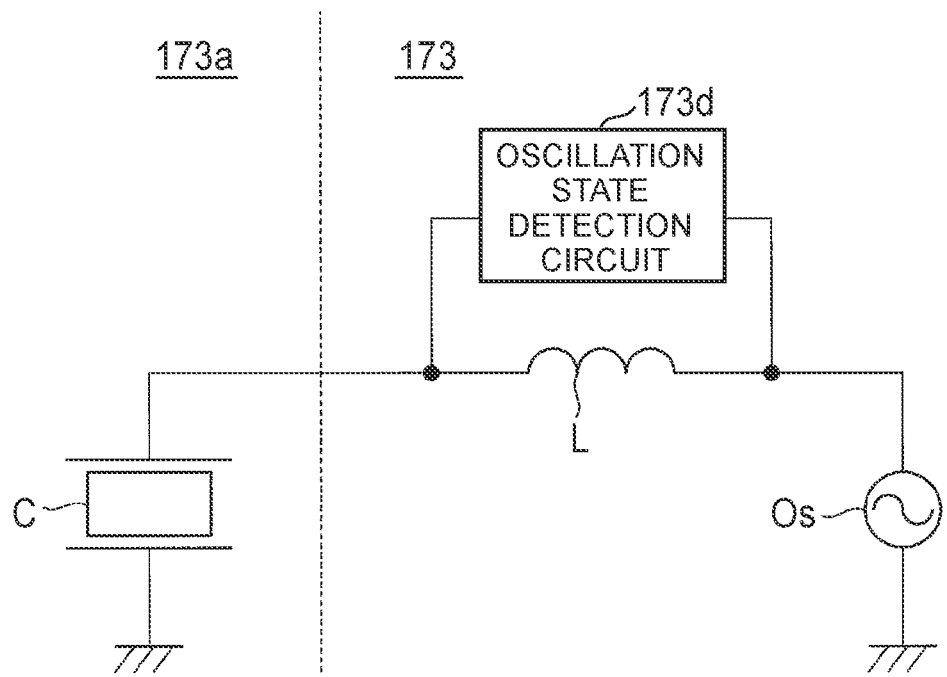
FIG. 4 is a circuit diagram illustrating a structure example of a proximity sensor according to the embodiment.

Next, a structure example of the proximity sensor 173 according to the embodiment will be described. FIG. 4 is a circuit diagram illustrating the structure example of the proximity sensor 173 according to the embodiment.

In the example illustrated in FIG. 4, the proximity sensor 173 includes an oscillation state detection circuit 173*d*, a coil L, and an alternating-current power supply Os. The detection element 173*a* includes a capacitor C. One end of the alternating-current power supply Os is grounded, and the other end thereof is connected to one end of the coil L. The one end of the coil L is connected to the other end of the alternating-current power supply Os, and the other end of the coil L is connected to one end of the capacitor C. the one end of the capacitor C is connected to the other end of the coil L, and the other end of the capacitor C is grounded. According to this structure, an oscillation circuit including the coil L and a resistance element R is formed. In the oscillation circuit, the potential difference caused between both ends of the coil L at an oscillation frequency determined by the capacitance of the capacitor C and the inductance of the coil L becomes the maximum. In general, since the polarization at both ends of the capacitor C becomes remarkable as an object approaches the capacitor C, the capacitance of the capacitor C detected by the proximity sensor 173 becomes large.

Therefore, as the object approaches closer to the capacitor C, the oscillation frequency becomes lower. Then, the oscillation state detection circuit 173d measures the potential difference caused between both ends of the coil L, and outputs, to the output control unit 203 of the EC 171, a detection signal indicating the measured potential difference as a count number. Here, the frequency of an alternating-current voltage to be applied from the alternating-current power supply Os to the oscillation circuit is set to an oscillation frequency (hereinafter a reference frequency) in a state where the object is separated sufficiently from the capacitor C. Since the capacitance of the capacitor C becomes large as the object approaches the detection element 173a having the capacitor C, the oscillation frequency of the oscillation circuit is lowered. Therefore, the potential difference between both ends of the coil L detected by the oscillation state detection circuit 173d becomes small according to an increase in capacitance due to the approach of the object. Thus, the output control unit 203 can use the count number indicated by the detection signal input from the proximity sensor 173 to detect the approach of the object to the detection element 173a.

(Detection Example of Count Number)

Next, detection examples of count numbers detected at the proximity sensor 173 will be described. FIG. 5 to FIG. 8 are charts illustrating the detection examples of count numbers, where the ordinate and the abscissa represent count number and time, respectively. The count number is an index value indicating that the larger the count number, the smaller the capacitance of the detection element 173a. Therefore, a decrease in the count number indicates the approach of an object (including a human body). In order to detect the decrease in the count number, the output control unit 203 calculates a long term average value LTA of count numbers each detected in every predetermined sampling cycle (for example, 20 to 100 ms, typically 62.5 ms (16 [Hz] when converted to the sampling frequency)), and determines a value smaller by a predetermined value than the calculated long term average value LTA to be a detection threshold value TH. The detection threshold value TH corresponds to the detection threshold value 1 described above.

The long term average value at the present sampling time is calculated as the sum of multiplied values obtained by multiplying the long term average value LTA at the last sampling time and the count number at the present sampling time by weighting factors, respectively. As the weighting factor for the long term average value LTA at the last sampling time, a predetermined forgetting factor (a real number larger than 0 and smaller than 1, for example, 0.05 to 0.2) is used, and as the weighting factor for the count number at the present sampling time, a value obtained by subtracting the forgetting factor from 1 is used. Thus, the output control unit 203 can update the long term average value LTA in every sampling cycle by using the count number at the present sampling time. However, when the count number falls below the detection threshold value TH, the output control unit 203 stops the update of the long term average value LTA and maintains the long term average value LTA at the sampling time immediately before the stop. Therefore, the detection threshold value TH is also maintained.

Figure 5:
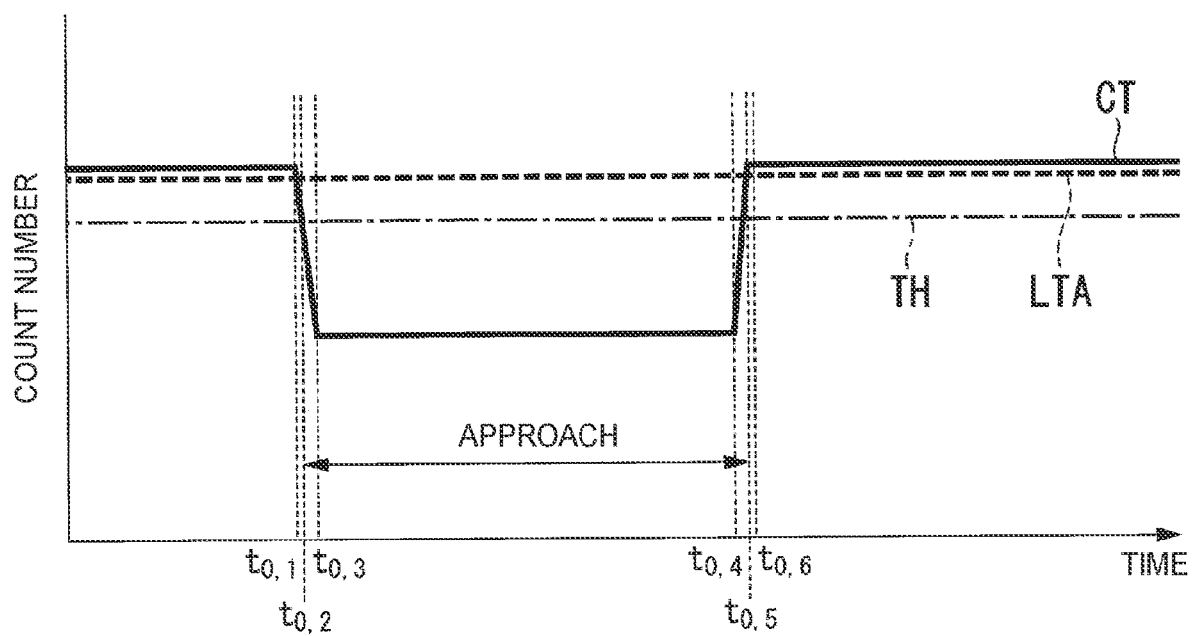
FIG. 5 is a chart illustrating a first detection example of the count number.

FIG. 5 illustrates an example of count number when the use mode is not changed to the tablet mode. In this example, a human body is separated sufficiently from the information processing apparatus 10 at first. The human body approaches the information processing apparatus 10 at time t0,1, the information processing apparatus 10 is placed on a user's lap, and the information processing apparatus 10 is moved away from the lap at time t0,6. A solid line, a bold dashed line, and a long dashed-short dashed line indicate raw count number CT, long term average value LTA, and detection threshold value TH, respectively. At first, the count number CT and the long term average value LTA are almost equal values. The detection threshold value TH is determined to be a value smaller by a predetermined value than the long term average value LTA. When the human body approaches the information processing apparatus 10 from time t0,1 to time t0,3, the count number also decreases in response to the approach. The output control unit 203 determines that the count number CT falls below the detection threshold value TH at time t0,2 at which the human body is in the process of approaching, and outputs the radio-wave output reduction control signal to the communication module 159. Further, the output control unit 203 stops the update of the long term average value LTA.

When the human body gets away from the information processing apparatus 10 from time t0,4 to time t0,6, the count number increases up to the initial value. The output control unit 203 determines that the count number CT becomes equal to or more than the detection threshold value TH at time t0,5 at which the human body is in the process of getting away from the information processing apparatus 10, and outputs the radio-wave output reduction cancellation control signal to the communication module 159. Further, the output control unit 203 resumes the update of the long term average value LTA. Thus, during a period from time t0,2 to time t0,5, where the human body is approaching the information processing apparatus 10, the output intensity of radio waves sent out from the antenna 159a is more reduced than that in the case where the human body is not approaching.

Figure 6:
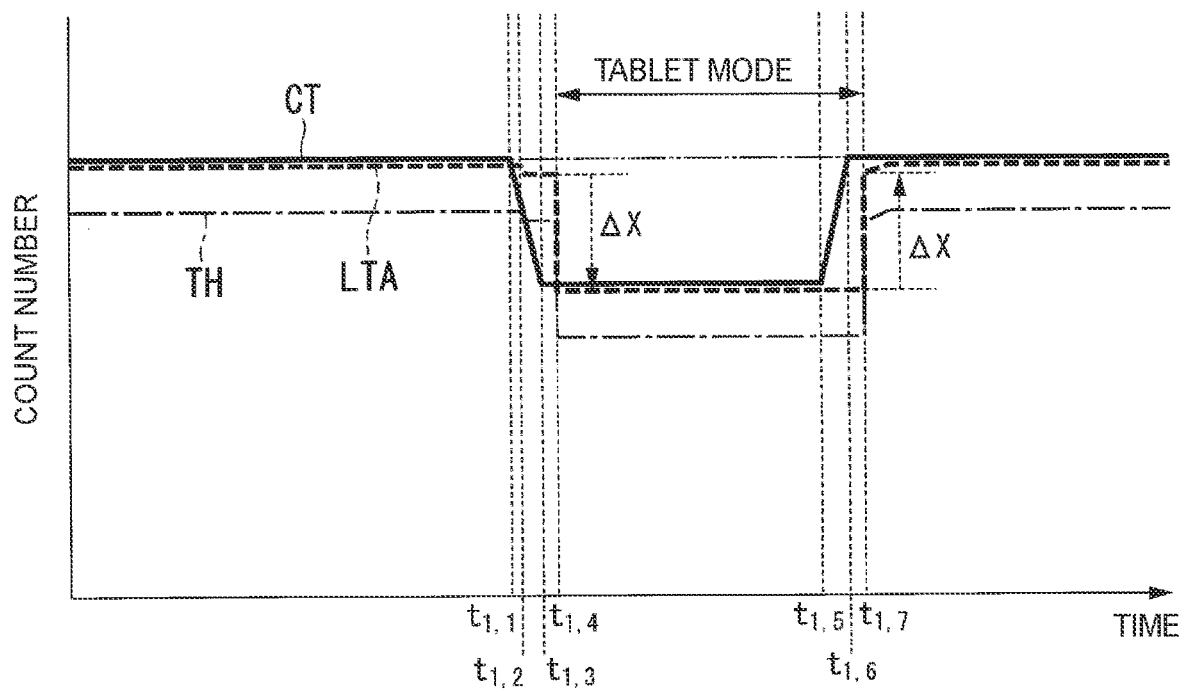
FIG. 6 is a chart illustrating a second detection example of the count number.
Figure 7:
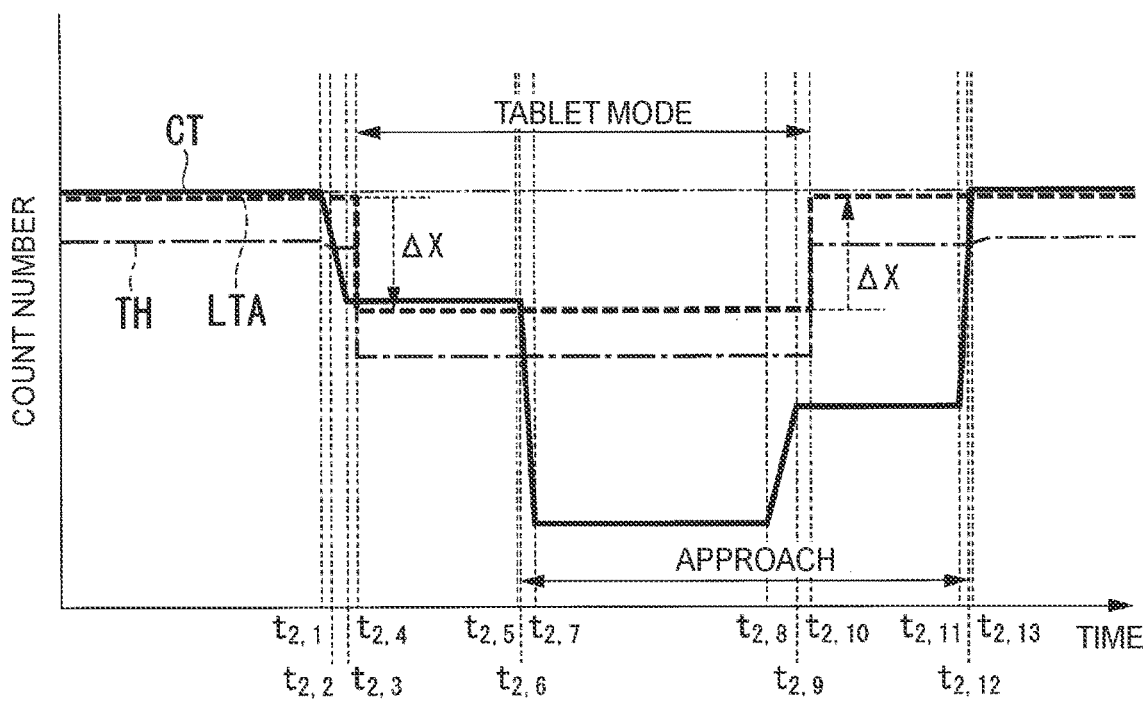
FIG. 7 is a chart illustrating a third detection example of the count number.
Figure 8:
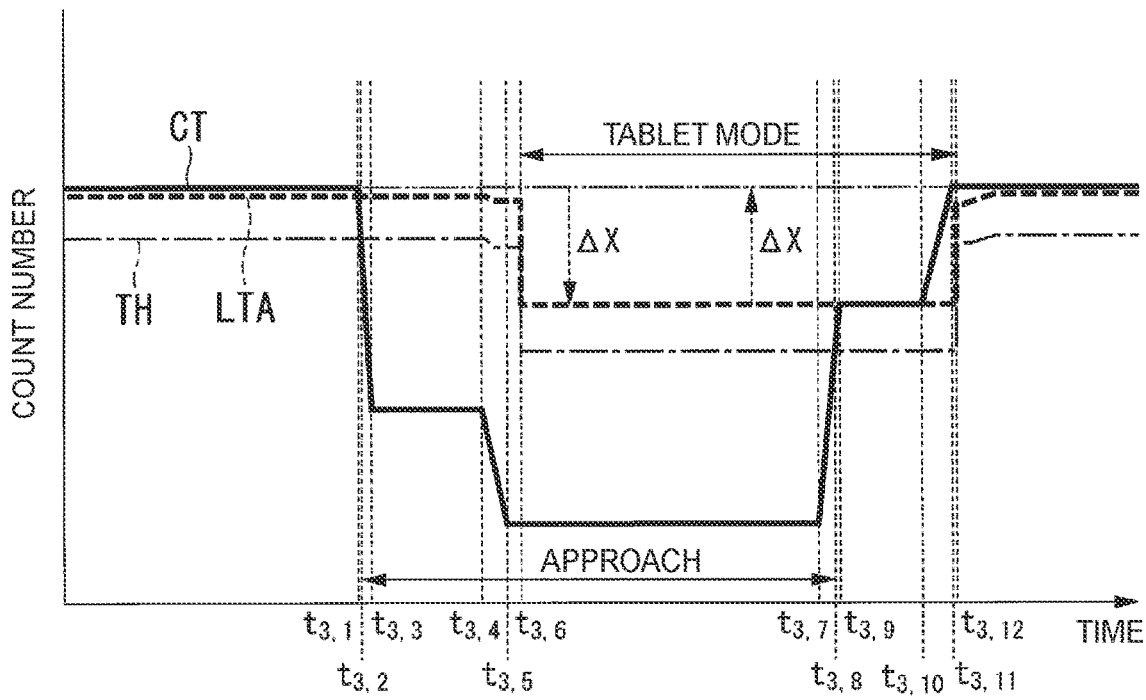
FIG. 8 is a chart illustrating a fourth detection example of the count number.

FIG. 6 to FIG. 8 illustrate examples of count numbers involved in a change of the use mode to the tablet mode. Note that in the example of FIG. 6, the human body does not approach the information processing apparatus 10 while staying at a sufficient distance. Further, although the opening/closing angle θ is 120° at first, the opening/closing angle θ changes from 120° to 360° during a period from time t1,1 to time t1,3, and changes from 360° to 120° during a period from time t1,5 to time t1,6. In response, the count number CT decreases from time t1,1 to time t1,3, becomes almost constant during a period from time t1,3 to time t1,5, and increases up to the original value from time t1,5 to time t1,6.

The mode determination unit 201 determines the use mode to be a non-tablet mode until time t1,4, and determines the use mode to be the tablet mode during a period from time t1,4 to time t1,7. After time t1,7, the mode determination unit 201 determines the use mode to be the non-tablet mode again. Time t1,4 and time t1,7 correspond to time points later than time t1,3 and time t1,6 by a processing time required to determine the mode, respectively. Therefore, the output control unit 203 adds a predetermined correction value ΔX (negative value) to the detection threshold value TH at time t1,4, and subtracts the correction value ΔX from the detection threshold value TH at time t1,7. The value obtained by adding the correction value ΔX to the detection threshold value TH corresponds to the detection threshold value 2 mentioned above. During a period from time t1,2 to time t1,4, the count number CT becomes smaller than the detection threshold value TH very temporarily, but the count number CT becomes equal to or more than the detection threshold value TH for most of the period where the use mode is determined to be the tablet mode. Therefore, when the use mode is the tablet mode, an unnecessary output reduction due to the approach of the first chassis 101 to the detection element 173a can be avoided.

In the example of FIG. 7, although the opening/closing angle θ is 120° at first, the opening/closing angle θ changes from 120° to 360° during a period from time t2,1 to time t2,3. In response, the count number CT decreases from time t2,1 to time t2,3, and becomes almost constant during a period from time t2,3 to time t2,6.

On the other hand, the human body is separated sufficiently from the information processing apparatus 10 at first, and then approaches the information processing apparatus 10 from time t2,6 to time t2,7. In response, the count number CT decreases from time t2,6 to time t2,7, and becomes almost constant during a period from time t2,7 to time t2,8.

Next, the opening/closing angle θ changes from 360° to 120° during a period from time t2,8 to time t2,9. In response, the count number CT increases from time t2,8 to time t2,9, and becomes almost constant during a period from time t2,9 to time t2,11.

Then, the human body gets away from the information processing apparatus 10 from time t2,11 to time t2,13. In response, the count number CT increases from time t2,11 to time t2,13 up to almost the initial value.

The mode determination unit 201 determines the use mode to be the non-tablet mode until time t2,4, and determines the use mode to be the tablet mode during a period from time t2,4 to time t2,10. Then, the mode determination unit 201 determines the use mode to be the non-tablet mode at time t2,10 again. Time t2,4 and time t2,10 correspond to time points later than time t2,3 and time t2,9 by a processing time required to determine the mode, respectively. Therefore, the output control unit 203 adds the predetermined correction value ΔX (negative value) to the detection threshold value TH at time t2,4, and subtracts the correction value ΔX from the detection threshold value TH at time t2,10. During a period from time t2,2 to time t2,4, the count number CT becomes smaller than the detection threshold value TH very temporarily, but the count number CT becomes equal to or more than the detection threshold value TH from t2,4 to time t2,6 in the period where the operating mode is determined to be the tablet mode. This period almost corresponds to a period where the human body is not approaching the information processing apparatus 10, and the output control unit 203 causes the communication module 159 not to reduce the output.

The output control unit 203 determines that the count number CT becomes less than the detection threshold value TH at time t2,6, and outputs the output reduction control signal to the communication module 159. Then, the output control unit 203 determines that the count number CT becomes equal to or more than the detection threshold value TH at time t2,12, and outputs the output reduction cancellation control signal to the communication module 159. The period from time t2,6 to time t2,12 almost corresponds to a period where the human body is approaching the information processing apparatus 10, and the output control unit 203 causes the communication module 159 to reduce output more than output in the other periods.

Thus, the period where the human body approaches the information processing apparatus 10 in the tablet mode in which an output reduction is required can be detected more accurately by controlling whether to compensating for the detection threshold value TH or not depending on whether the use mode is the tablet mode or not.

FIG. 8 illustrates an example in which the opening/closing angle θ is 120° at first and the human body is separated sufficiently from the information processing apparatus 10, but the approach of the human body to the information processing apparatus 10 is earlier than the transition of the user mode to the tablet mode. More specifically, the human body approaches from time t3,1 to time t3,3. In response, the count number CT decreases from time t3,1 to time t3,3, and becomes almost constant during a period from time t3,3 to time t3,4.

On the other hand, the opening/closing angle θ changes from 120° to 360° during a period from time t3,4 to time t3,5. In response, the count number CT decreases from time t3,4 to time t3,5, and becomes constant during a period from time t3,5 to time t3,7.

Next, the human body gets away from the information processing apparatus 10 from time t3,7 to time t3,9. In response, the count number CT increases from time t3,7 to time t3,9, and becomes almost constant during a period from time t3,9 to time t3,10.

Then, the opening/closing angle θ changes from 360° to 120° during a period from time t3,10 to time t3,12. In response, the count number CT increases from time t3,10 to time t3,12 up to almost the initial value.

The mode determination unit 201 determines the use mode to be the non-tablet mode until time t3,6, and determines the use mode to be the tablet mode during a period from time t3,6 to time t3,12. Then, the mode determination unit 201 determines the use mode to be the non-tablet mode at time t3,12 again. Time t3,6 and time t3,12 correspond to time points later than time t3,5 and time t3,11 by a processing time required to determine the mode, respectively. Therefore, the output control unit 203 adds the predetermined correction value ΔX (negative value) to the detection threshold value TH at time t3,6, and subtracts the correction value ΔX from the detection threshold value TH at time t3,12.

The output control unit 203 determines that the count number CT becomes less than the detection threshold value TH at time t3,2, and outputs the output reduction control signal to the communication module 159. Then, the output control unit 203 determines that the count number CT becomes equal to or more than the detection threshold value TH at time t3,8, and outputs the output reduction cancellation control signal to the communication module 159. During a period from time t3,2 to time t3,8, the count number CT is less than the detection threshold value TH. This period almost corresponds to a period where the human body is approaching the information processing apparatus 10, and the output control unit 203 causes the communication module 159 to reduce the output of radio waves from the antenna 159a more than output in the other periods.

Thus, the period where the human body approaches the information processing apparatus 10 in the tablet mode in which an output reduction is required can be detected more accurately by controlling whether to compensating for the detection threshold value TH or not depending on whether the use mode is the tablet mode or not.

(Output Control)

Figure 9:
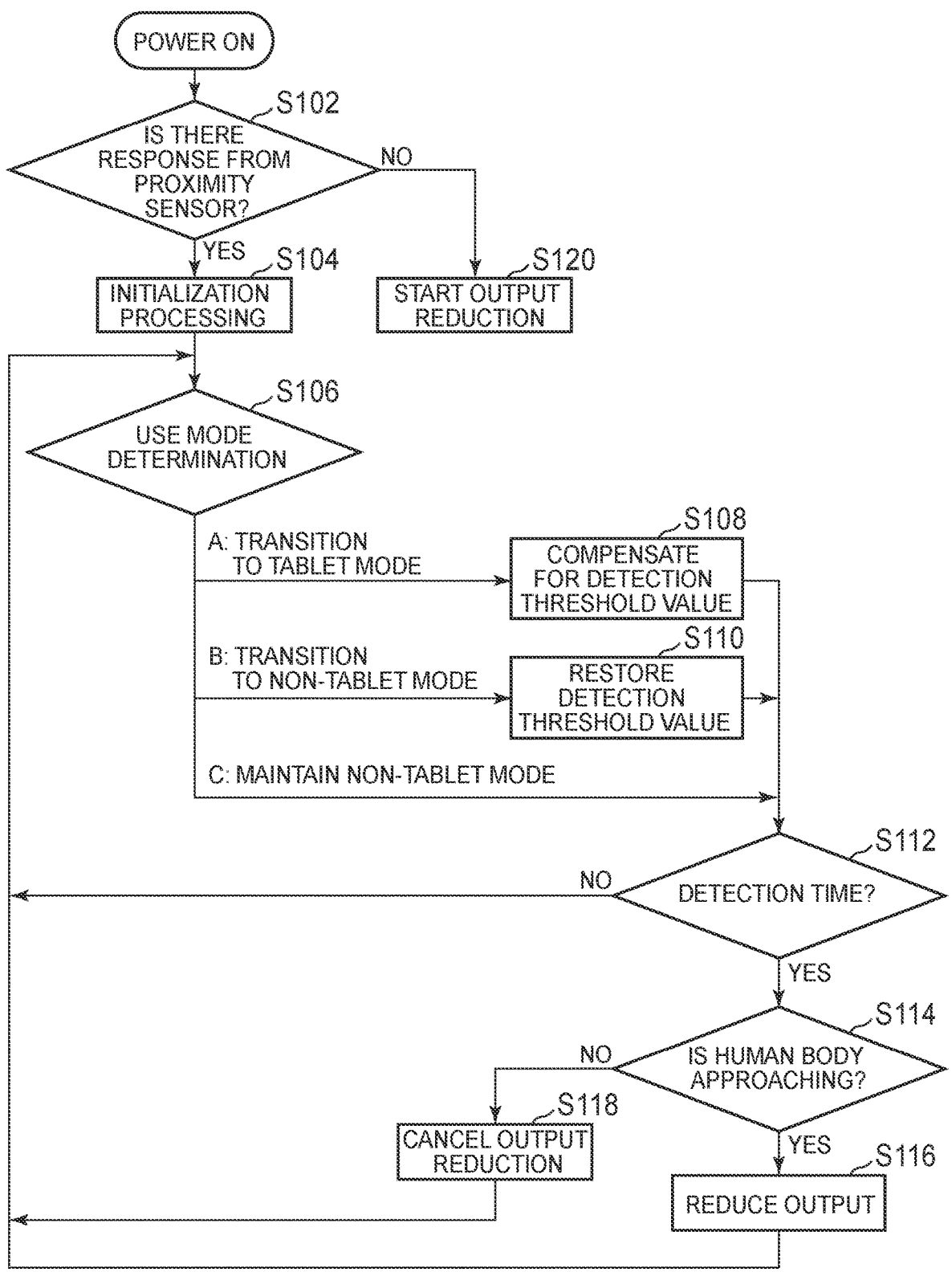
FIG. 9 is a flowchart illustrating an example of power control according to the embodiment.

Next, an example of output control according to the embodiment will be described. FIG. 9 is a flowchart illustrating an example of output control according to the embodiment. Processing illustrated in FIG. 9 is started after the start of the supply of power to the information processing apparatus 10 (power ON).

(Step S102) The output control unit 203 executes device detection processing for detecting various devices connected to the own apparatus. In the device detection processing, the output control unit 203 outputs a device detection signal to each of the devices including the proximity sensor 173. When the device detection signal is input from the output control unit 203 during operation, the proximity sensor 173 outputs a response signal to the output control unit 203 as a response thereto.

When the response signal is input from the proximity sensor 173 within a predetermined time (for example, one to three seconds) after outputting the device detection signal (step S102: YES), the output control unit 203 proceeds to processing in step S104. When the response signal is not input from the proximity sensor 173 within the predetermined time after outputting the device detection signal (step S102: NO), the output control unit 203 proceeds to processing in step S120.

(Step S104) The output control unit 203 executes initialization processing. In the initialization processing, for example, the output control unit 203 performs parameter settings such as the detection threshold value TH. After the output control unit 203 completes the initialization processing, the procedure proceeds to processing in step S106.

(Step S106) Based on the acceleration signals input from the acceleration sensors 175a, 175b, the mode determination unit 201 determines the opening/closing angle θ and the touch screen direction, and determines the use mode based on the determined opening/closing angle θ and touch screen direction. When the mode determination unit 201 determines the transition from the non-tablet mode to the tablet mode (step S106: A), the procedure proceeds to processing in step S108. When the mode determination unit 201 determines the transition from the tablet mode to the non-tablet mode (step S106: B), the procedure proceeds to processing in step S110. When the mode determination unit 201 determines that the non-tablet mode is maintained (step S106: C), the procedure proceeds to processing in step S112.

(Step S108) The output control unit 203 adds the predetermined correction value ΔX to the detection threshold value TH (compensation). After that, the output control unit 203 proceeds to processing in step S112.

(Step S110) The output control unit 203 subtracts the predetermined correction value ΔX from the detection threshold value TH (restoration). After that, the output control unit 203 proceeds to processing in step S112.

(Step S112) The output control unit 203 determines whether the current time is a detection time in every predetermined sampling cycle or not. When determining that the current time is the detection time (step S112: YES), the output control unit 203 proceeds to processing in step S114. When determining that the current time is not the detection time (step S112: NO), the procedure returns to the processing in step S106.

(Step S114) The output control unit 203 determines whether the human body is approaching the detection element 173a or not depending on whether the count number CT indicated by the detection signal input from the proximity sensor 173 is less than the set detection threshold value TH or not. When determining that the human body is approaching (step S114: YES), the output control unit 203 proceeds to processing in step S116. When determining that the human body is not approaching the detection element 173a (step S114: NO), the output control unit 203 proceeds to processing in step S118.

(Step S116) The output control unit 203 outputs the output reduction control signal to the communication module 159. Thus, the output control unit 203 causes the communication module 159 to reduce the output of radio waves from the antenna 159a. After that, the procedure returns to the processing in step S106.

(Step S118) The output control unit 203 outputs the output reduction cancellation control signal to the communication module 159. Thus, the output control unit 203 causes the communication module 159 to cancel the reduction in the output of radio waves from the antenna 159a. After that, the procedure returns to the processing in step S106.

(Step S120) The output control unit 203 outputs the output reduction control signal to the communication module 159. Thus, the output control unit 203 causes the communication module 159 to reduce the output of radio waves from the antenna 159a. After that, the processing illustrated in FIG. 9 is ended.

(Use Mode)

Next, examples of use modes of the information processing apparatus 10 according to the embodiment will be described. FIGS. 10A-10E are explanatory diagrams illustrating examples of use modes realized by the information processing apparatus 10 according to the embodiment.

The use modes of the information processing apparatus 10 include the laptop mode, the tent mode, the stand mode, the tablet mode, and the book mode.

Figure 10A:
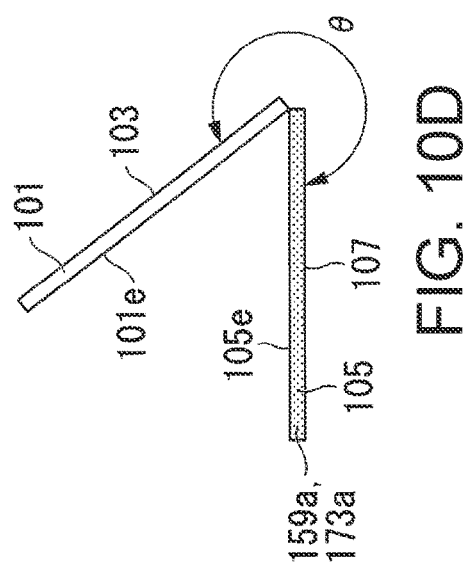
FIG. 10A is an explanatory diagram illustrating one example of a use mode according to the embodiment.

FIG. 10A illustrates a closed mode. In the closed mode, the opening/closing angle θ is 0° as an example. When the opening/closing angle θ is 0°, the mode determination unit 201 can determine that the use mode of the information processing apparatus 10 is the closed mode.

In the closed mode, the touch screen 103 and the keyboard 107 face each other. In the closed mode, the system device SD may cause the operating state of the own unit to make a transition from the normal state to a power-off state or a sleep state and stop the operation. In the power-off state or the sleep state, the touch screen 103, the keyboard 107, and the touch pad 109 cannot be used.

Figure 10D:
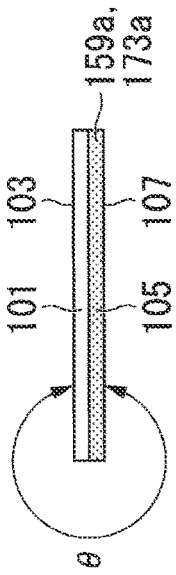
FIG. 10D is an explanatory diagram illustrating a further example of a use mode according to the embodiment.
Figure 10B:
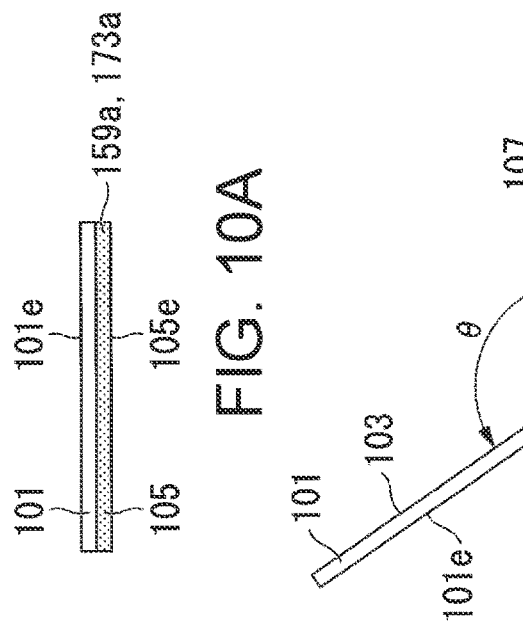
FIG. 10B is an explanatory diagram illustrating another example of a use mode according to the embodiment.

FIG. 10B illustrates the laptop mode. In the laptop mode, the opening/closing angle θ is 0°<θ<190° as an example. When the opening/closing angle θ is 0°<θ<190°, the mode determination unit 201 can determine that the use mode of the information processing apparatus 10 is the laptop mode.

In the laptop mode, the touch sensor of the touch screen 103, the keyboard 107 and touch pad 109 are usable as the input device, and the display of the touch screen 103 is usable as an output device. The user can use the input device to operate the information processing apparatus 10.

Figure 10E:
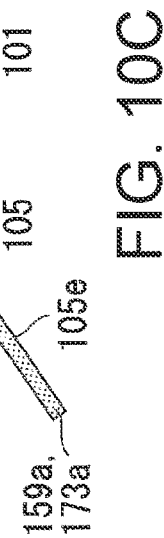
FIG. 10E is an explanatory diagram illustrating another example of a use mode according to the embodiment.
Figure 10C:
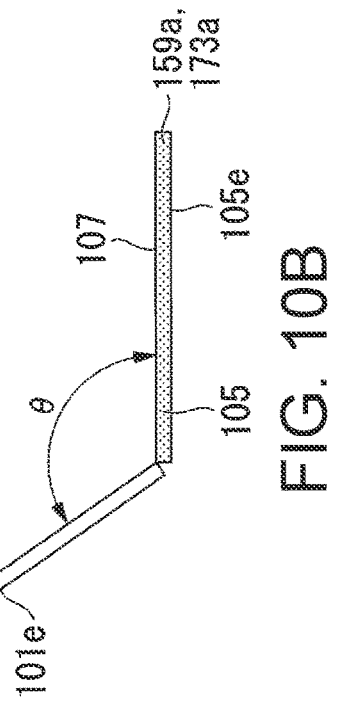
FIG. 10C is an explanatory diagram illustrating yet another example of a use mode according to the embodiment.

FIG. 10C and FIG. 10D illustrate the tent mode and the stand mode, respectively. In both the tent mode and the stand mode, the opening/closing angle θ is 190°<θ<360° as an example. The tent mode and the stand mode are different in the vertically up and down direction of the first chassis 101. In other words, the mode determination unit 201 can determine the use mode to be the tent mode when the side face 101c of the first chassis 101 (the face on which the rotating shafts of the hinge mechanisms 121a, 121b are placed) faces more upward than the other side faces. On the other hand, the mode determination unit 201 can determine the use mode to be the stand mode when the side face 101*a* (the face getting away from the side face 105*a* of the second chassis 105 due to the rotation of the first chassis 101) faces more upward than the other side faces. In both the tent mode and the stand mode, the touch sensor of the touch screen 103 is usable as the input device, and the display of the touch screen 103 is usable as the output device. In the tent mode, the display of the touch screen 103 can be tilted to make it easy for the user to see. In the stand mode, the keyboard 107 is not placed on the front surface of the display. This is convenient when there is no need to input from the keyboard 107.

FIG. 10E illustrates the tablet mode. In the tablet mode, the back face 101*e* of the first chassis 101 and the back face 105*e* of the second chassis 105 face each other. In this case, the opening/closing angle θ is 360° as an example. In the tablet mode, the display of the touch screen 103 is usable as the output device. The tablet mode is a use mode capable of turning the display to the user's face and turning and holding the keyboard 107 and the touch pad 109 onto the back face.

Figure 11A:
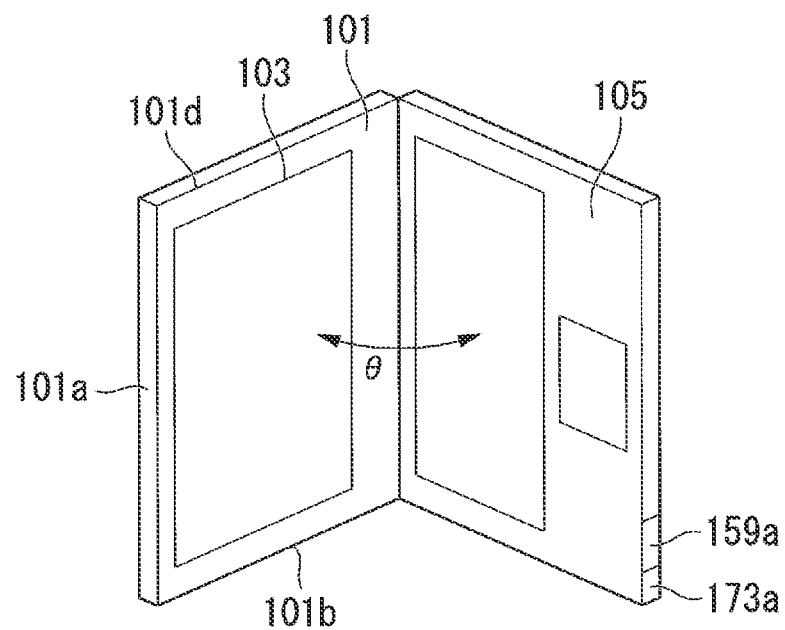
FIG. 11A is an explanatory diagram illustrating still another example of a use mode according to the embodiment.
Figure 11B:
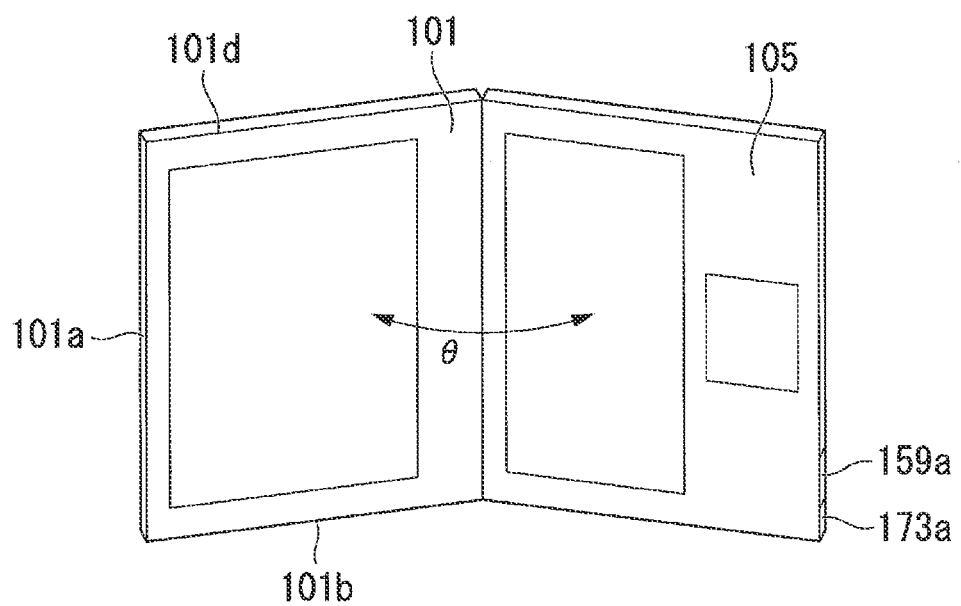
FIG. 11B is an explanatory diagram illustrating one example of a use mode according to the embodiment.

FIG. 11A and FIG. 11B illustrate the book mode, respectively. The book mode is a state where the first chassis 101 is open to the second chassis 105, which is a use mode in which the side face 101*b* or the side face 101*d* faces vertically upward regardless of the opening/closing angle θ (other than 0° or 360°). In the book mode, the touch sensor of the touch screen 103 is usable as the input device, and the display of the touch screen 103 is usable as the output device.

The above-mentioned use modes can also be grasped as indicators of distance between the first chassis 101 and the detection element 173*a*. Among these use modes, when the use mode is the closed mode or the tablet mode, the first chassis 101 comes closest to the detection element 173*a*. However, when the use mode is the closed mode, the information processing apparatus 10 may not operate as mentioned above.

Next, an example of the control table 215 will be described. The control table 215 is data used to control the use mode based on the opening/closing angle θ and control devices depending on the use mode. FIG. 12 is a table illustrating an example of the control table 215 according to the embodiment. The control table 215 includes a first table 215*a* and a second table 215*b*. The control table 215 may be set independently of firmware. This allows a manufacturer or a maintainer to change set values arbitrarily. Further, even after the user starts use of the information processing apparatus 10, the set values may also be updatable by executing predetermined system/firmware or an app. Thus, the control pf each device is customized.

The first table 215*a* includes fields of entry angle, exit angle, adjustment range, and retention time for each of a plurality of angle ranges. The mode determination unit 201 refers to the first table 215*a* to specify the angle range based on the specified opening/closing angle θ.

The entry angle is the minimum reference value of the opening/closing angle θ to define the angle range. The exit angle is the maximum reference value of the opening/closing angle θ to define the angle range. The adjustment range is an angle to give hysteresis upon transition to an adjacent angle range due to a change in opening/closing angle θ. For example, the first table 215*a* has adjustment ranges of 10° for the upper limit (entry) and the lower limit (exit) on angle range 3, respectively. Upon transition from angle range 2 to angle range 3 by increasing the opening/closing angle θ, the mode determination unit 201 makes the transition from angle range 2 to angle range 3 when the opening/closing angle θ becomes 145° obtained by adding the adjustment range of 10° for the upper limit to the entry angle 135° of angle range 3.

The mode determination unit 201 maintains angle range 3 as the angle range after specifying angle range 3 as the angle range until the opening/closing angle θ decreases up to 125° obtained by subtracting the adjustment range of 10° for the lower limit from the entry angle 135° of angle range 3. After that, when the opening/closing angle θ becomes less than 125°, the mode determination unit 201 makes a transition from angle range 3 to angle range 2. Thus, the opening/closing angle θ in each angle range falls within a range adjusted by applying an adjustment range according to the direction of rotation to the entry angle or the exit angle. As the direction of rotation, one of values in an opening direction and a closing direction is taken. The opening direction is a direction in which the opening/closing angle θ increases over time. The closing direction is a direction in which the opening/closing angle θ decreases over time.

Providing the adjustment range can prevent the use mode corresponding to each angle range from being changed according to a change in opening/closing angle θ even when the opening/closing angle θ is changed frequently near the border between angle ranges. The retention time corresponds to a delay time after a specific angle range is once specified until any other angle range is specified. When the opening/closing angle θ changes continuously from 0° to 360° at a predetermined speed, the mode determination unit 201 can prevent from specifying angle ranges on an angle-by-angle basis in the middle of the change in opening/closing angle θ.

In the example illustrated in FIG. 12, two angle ranges, that is, any one of angle ranges 1 to 5 and either one of angle ranges 6 and 7 could be specified together. The mode determination unit 201 further uses the touch screen direction to specify one of two use modes corresponding to the two angle ranges.

Further, the mode determination unit 201 can identify whether the opening/closing angle θ is 0° or 360° based on the magnetic strength detected by the Hall sensor 179.

The second table 215*b* is constructed to include fields of touch screen direction/use mode, rotation direction/screen control, and book mode screen control for each of the plurality of angle ranges.

In the field of touch screen direction/use mode, the identifier of a use mode is described in relation to each of pairs of touch screen direction and angle range of four side faces 101*a* to 101*d*. In the field of rotation direction/screen control, screen control data indicative of display/non-display of the screen in angle range 1 and screen control data indicative of a display direction of the screen in angle range 4 are described for each rotation direction of the first chassis 101. In the field of book mode screen control, screen control data indicative of disabling of an automatic rotation function of the screen in angle range 6 and screen control data indicative of enabling of the automatic rotation function of the screen in angle range 7 are described.

More specifically, when the angle range is 0, the second table 215*b* indicates that the use mode is the closed mode in all the touch screen directions. When the angle range is any one of angle ranges 1 to 4 and either one of the side faces 101*a* and 101*c* of the first chassis 101 faces in a relatively upward direction, the second table 215*b* indicates that the use mode is the laptop mode. Further, when the angle range is 6 or 7 and either one of the side faces 101*b* and 101*d* faces in the relatively upward direction, the second table 215b indicates that the use mode is the book mode.

In the second table 215b, when the side face 101c faces upward, the laptop mode and the tent mode are distinguished from each other as the use mode depending on whether the angle range is 4 or 5. Note, however, that the use mode may be the tent mode when the angle range is 4 and the side face 101c faces upward. Further, in a case where the angle range is 5, when the side face 101a faces upward, the second table 215b indicates that the use mode is the stand mode, while when the side face 101c faces upward, the second table 215b indicates that the use mode is the tent mode. In a case where the angle range is 8, the second table 215b indicates that the use mode is the tablet mode in either touch screen direction.

Next, an example of screen control will be described. The mode determination unit 201 refers to the second table 215b, and when it is recognized that the angle range is 1 and the rotation direction is the closing direction, the mode determination unit 201 stops the screen display on the touch screen 103. Note, however, that the mode determination unit 201 does not cause the system to make a transition to the sleep state at this stage.

After that, when the angle range makes a transition from 1 to 2, the mode determination unit 201 resumes the screen display on the touch screen 103.

The mode determination unit 201 refers to the second table 215b, and when it is recognized that the angle range is 4 and the rotation direction is the opening direction, the mode determination unit 201 reverses the screen display on the touch screen 103. The reverse display of the screen means that the screen is displayed by reversing the vertical direction thereof. In other words, the screen to be displayed with the side face 101a upward is displayed with the side face 101c upward.

The mode determination unit 201 refers to the second table 215b, and when it is recognized that the angle range is 4 and the rotation direction is the closing direction, the mode determination unit 201 cancels the reverse display on the touch screen 103, and provides the normal display.

The mode determination unit 201 refers to the second table 215b, and when the angle range is 6 and the side face 101b or the side face 101d faces relatively upward, the mode determination unit 201 determines that the use mode is the book mode, and disables (locks) automatic screen control.

The mode determination unit 201 refers to the second table 215b, and when the angle range is 7 and the side face 101b or the side face 101d faces relatively upward, the mode determination unit 201 determines that the use mode is the book mode, and enables automatic screen control.

(Variations)

In the above description, the case where the side face 101c of the first chassis 101 and the side face 105c of the second chassis 105 are connected to each other through the hinge mechanisms 121a, 121b in an inseparable manner is taken as an example, but the present invention is not limited to this structure. An information processing apparatus 10a illustrated in FIG. 14 is such that the second chassis 105 is detachable from the first chassis 101 with a user's operation. Along with the detachment of the second chassis 105, the keyboard 107 and the touch pad 109 are disconnected, and the information processing apparatus 10a functions as a tablet PC with the first chassis 101 alone.

The first chassis 101 includes the detection element 173a and the antenna 159a at one end thereof, and houses the system device SD, the audio device 157, the communication module 159, the HDD 161, the EC 171, the DC/DC converter 189, and the power supply unit 191 (FIG. 2) therein.

On the other hand, the second chassis 105 includes the keyboard 107 and the touch pad 109.

A machine-side connector 326 capable of selectively connecting a first connector 328 of the second chassis 105 and external devices are provided in the side face 101c of the first chassis 101. A pair of right and left guide recesses 333 are provided in the side face 101c of the first chassis 101 in a manner to stride across the machine-side connector 326. The pair of guide recesses 333 is constructed to have the same shape and same pitch as those of a pair of guide recesses 331 of the second chassis 105.

A machine mounting unit 324 coupled rotatably through a pair of hinge mechanisms 121a, 121b (not illustrated) is provided on the surface of a rear end portion of the second chassis 105, that is, on the side of the side face 105c. The machine mounting unit 324 is a section in which the first chassis 101 is mounted on the second chassis 105. The first connector 328 capable of connecting the machine-side connector 326 of the first chassis 101 is provided on a tip end face 324a of the machine mounting unit 324. A pair of right and left guide protrusions 330 is provided on the tip end face 324a in a manner to stride across the first connector 328.

A second connector 329 capable of connecting external devices may also be provided in the side face 105c of the second chassis 105. Further, the pair of right and left guide recesses 331 is provided in the side face 105c in a manner to stride across the second connector 329. The guide recesses 331 can be engaged detachably with guide protrusions of external devices constructed to have the same shape and same pitch as those of the guide protrusions 330.

Under such a structure, the output control unit 203 executes device detection processing for detecting various kinds of devices connected to the own apparatus every predetermined time (for example, everyone to three seconds), and outputs the detection result to the mode determination unit 201. Based on the detection result input from the output control unit 203, the mode determination unit 201 can determine whether the second chassis 105 is detached from the first chassis 101 or not.

For example, the mode determination unit 201 detects at least either one of the keyboard 107 and the touch pad 109 installed on the second chassis 105, and when a device (for example, the communication module 159) installed in the first chassis 101 can be detected, the mode determination unit 201 can determine that the second chassis 105 is connected to the first chassis 101. In this case, the mode determination unit 201 makes a use mode determination as mentioned above and writes information on the determined use mode to the field of use mode in the control register 217. Thus, the output control unit 203 controls whether to compensate for the detection threshold value TH with the predetermined correction value ΔX depending on whether the use mode is the tablet mode or not.

When both the keyboard 107 and the touch pad 109 installed on the second chassis 105 cannot be detected, the mode determination unit 201 determines that the second chassis 105 has been detached from the first chassis 101. In this case, the mode determination unit 201 writes, to the field of use mode in the control register 217, information indicative of the detachment of the second chassis 105 without making the use mode determination as mentioned above. When the use mode is the detachment of the second chassis 105, the output control unit 203 does not compensate for the detection threshold value TH with the predetermined correction value ΔX like in the case where the use mode is a use mode other than the tablet mode.

Further, in the information processing apparatus 10 illustrated in FIG. 1 and the information processing apparatus 10a illustrated in FIG. 14, the case where the first chassis 101 and the second chassis 105 are so provided that the first chassis 101 is rotatable with respect to the second chassis 105 is taken as an example, but the present invention is not limited to such a structure. The structure may also have any other form as long as such a member as to constitute part of the information processing apparatus 10, 10a can approach or separate from the detection element 173a with a user's operation without rotation.

Figure 15:
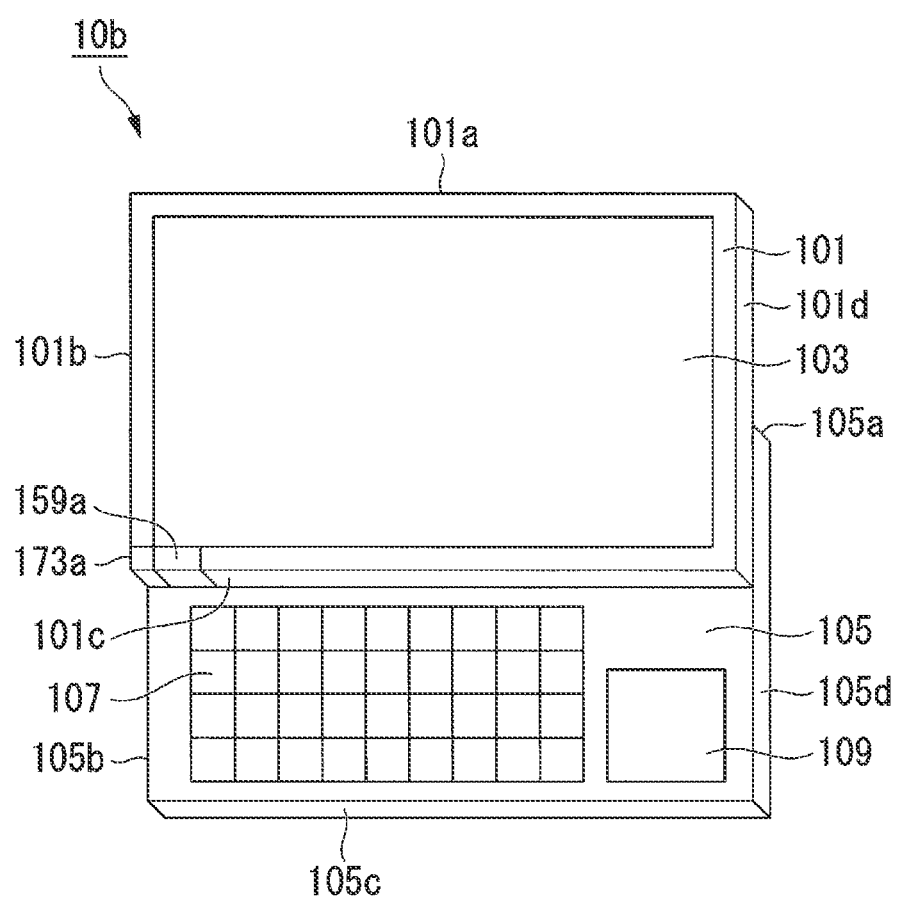
FIG. 15 is a diagram illustrating still another structure example of an information processing apparatus according to the embodiment.

An information processing apparatus 10b illustrated in FIG. 15 includes a guide mechanism (not illustrated). The guide mechanism is slidable in the depth direction while the first chassis 101 faces and remains in proximity to the second chassis 105, i.e., while the back face 101e (not illustrated) of the first chassis 101 faces and remains in proximity to the surface of the second chassis 105. Here, the depth direction is a direction from the side face 101c to the side face 101a.

The information processing apparatus 10b has at least two use modes (use modes 1 and 2). In the use mode 1, most of the surface of the second chassis 105 is covered with the first chassis 101 (compact mode). In this state, the touch screen 103 placed on the surface of the first chassis 101 is usable, but the keyboard 107 and the touch pad 109 placed on the surface of the second chassis 105 cannot be used. In the use mode 2, the whole surface of the second chassis 105 except for a small part thereof is exposed without being covered with the first chassis 101 (spread mode). In this state, the touch screen 103 placed on the surface of the first chassis 101 and the keyboard 107 and the touch pad 109 placed on the surface of the second chassis 105 are all usable.

Due to the positional relationship between the detection element 173a and the second chassis 105, the capacitance of the detection element 173a detected by the proximity sensor 173 in the use mode 1 tends to be higher than the capacitance detected in the use mode 2. Therefore, for example, the information processing apparatus 10b may also include a switch (not illustrated) whose two contacts touch each other when the keyboard 107 and the touch pad 109 are exposed due to the position of the first chassis 101, while the two contacts do not touch each other when the keyboard 107 and the touch pad 109 are not exposed. The mode determination unit 201 can determine whether the use mode is the use mode 1 or the use mode 2 depending on the presence or absence of conduction between the contacts.

The output control unit 203 sets the detection threshold value TH in the use mode 1 to a value (first detection threshold value: small capacitance) larger than the detection threshold value TH (second detection threshold value) in the use mode 2. The output control unit 203 controls the communication module 159 as to whether to reduce the output intensity of radio waves from the antenna 159a or not depending on whether the count number indicated by the detection signal from the proximity sensor 173 is larger than the detection threshold value TH or not as mentioned above. In the example illustrated in FIG. 15, proximity sensor 173, detection element 173a, it is assumed that the communication module 159 and the antenna 159a are placed on the side of the first chassis 101, but these may be placed on the side of the second chassis 105.

Note that the second chassis 105 illustrated in FIG. 15 may also be fully detachable from the first chassis 101. When the second chassis 105 is detached from the first chassis 101, the capacitance of the detection element 173a detected by the proximity sensor 173 is further lower than the capacitance in the use mode 1 in which the first chassis 101 is connected. Therefore, for example, the information processing apparatus 10b may further include a second switch (not illustrated) whose two contacts touch each other when the first chassis 101 is connected to the second chassis 105, while the two contacts do not touch each other when the second chassis 105 is detached.

The mode determination unit 201 can determine whether the second chassis 105 is detached or not as the use mode depending on the presence or absence of conduction between the two contacts of the second switch. The mode determination unit 201 determines the use mode when the second chassis 105 is detached from the first chassis 101 to be a use mode 3 (separation mode). The output control unit 203 has only to determine the detection threshold value TH in the use mode 3 to a value (third detection threshold value: small capacitance) larger than the detection threshold value TH (first detection threshold value) in the use mode 1.

Note that the second chassis 105 in the information processing apparatus 10a, 10b may also function as a keyboard device by itself. The second chassis 105 may also include peripheral devices such as a magnetic disk drive, an optical disk drive, and a battery device in addition to the keyboard 107 and the touch pad 109.

As described above, the information processing apparatus according to the embodiment (for example, the information processing apparatus 10, 10a, 10b) includes: a communication unit (for example, the communication module 159) for wirelessly communicating with other devices; a detection unit (for example, the proximity sensor 173) for detecting the physical quantity varying according to the approach of an object; a control unit (for example, the output control unit 203) for causing the communication unit to reduce the output of radio waves when the amount of change in physical quantity exceeds a predetermined threshold value (for example, each of the detection threshold values 1 to 3); a first chassis (the second chassis 105 in the example of FIG. 1, or the first chassis 101 in the examples of FIG. 14 and FIG. 15) in which the communication unit and the detection unit are mounted; and a predetermined member (the first chassis 101 in the example of FIG. 1, or the second chassis 105 in the examples of FIG. 14 and FIG. 15) whose position is variable to be placed at least in either a position to approach the first chassis or a position to separate from the first chassis. When the member is in the position to approach the first chassis, the control unit compensates for a change in physical quantity detected by the detection unit (for example, the detection element 173a) due to the approach of the member.

According to this configuration, since the change in physical quantity due to the approach of the member to the detection unit is compensated for, the output of radio waves can be prevented from being reduced despite the fact that no human body is approaching.

Further, the detection unit detects the capacitance of the capacitor as the physical quantity to obtain in advance the amount of change in capacitance caused to the detection unit by the member when the member is in the position to approach the first chassis. When the member is in the position to approach the first chassis, the control unit corrects the threshold value with the amount of change in capacitance, while when the member is in the position to separate from the first chassis, the control unit cancels the correction.

According to this configuration, since the capacitance is used as the physical quantity to be detected, the presence or absence of the approach of a human body can be detected stably without contact regardless of a surrounding environment such as temperature and illumination, and the influence of the presence or absence of the approach of the member to the detection unit can be removed or reduced.

Further, the member is the second chassis (in the example of FIG. 1, the first chassis 101) different from the first chassis (in the example of FIG. 1, the second chassis 105), and rotating mechanisms (for example, the hinge mechanisms 121a, 121b) are provided to make the first chassis rotatable with respect to the second chassis while coupling the first chassis and the second chassis. Then, the control unit determines whether the position of the second chassis is either the position to approach the first chassis or the position to separate from the first chassis based on the angle (for example, opening/closing angle θ) between the first chassis and the second chassis.

According to this configuration, the angle between the first chassis and the second chassis can be used to adjust the threshold value used for a necessity determination on the compensation for the physical quantity to be detected. Therefore, the information processing apparatus 10 having the first chassis rotatable with respect to the second chassis can also work with any other function using the angle therebetween (for example, use mode control).

Further, the information processing apparatus includes a display unit (for example, the touch screen 103) for displaying visual information on the surface of either one of the first chassis and the second chassis (for example, the first chassis 101), and an operation input unit (for example, the keyboard 107 and the touch pad 109) for accepting operations on the other of the first chassis and the second chassis (for example, the second chassis 105). Further, when the direction of the display unit is a direction opposite to the direction of the operation input unit, the control unit determines that the second chassis is in the position to approach the first chassis, while when the direction of the display unit is not the direction opposite to the direction of the operation input unit, the control unit determines that the second chassis is in the position to separate from the first chassis.

According to this configuration, the threshold value used for the necessity determination on the compensation for the physical quantity to be detected can be adjusted depending on whether the first chassis and the second chassis are turned over each other or not. Therefore, the necessity for the adjustment of the threshold value used for the necessity determination on the compensation for the physical quantity to be detected can be simply determined.

Further, the communication unit is communicable with other devices via a public wireless communication network.

According to this configuration, when a human body approaches the information processing apparatus in the communication using the public wireless communication network for which a relatively high radio wave intensity is required, the output of radio waves can be reduced more reliably.

Further, the second chassis 105 may also function solely as a keyboard device. The second chassis 105 may also include peripheral devices, such as a magnetic disk drive, an optical disk drive, and a battery device, as well as the keyboard 107 and the touch pad 109.

Note that various setting data according to the embodiment, for example, records and field items that constitute the control table 215, and control data, are examples for describing the embodiment, and other values can be employed without departing from the concept of the embodiment. Further, some or all pieces of data in the control table 215 may also be embedded in the code of firmware for controlling the operation of the EC 171.

Further, some of the use modes mentioned above may be omitted. For example, the book mode may be omitted. In this case, the mode determination unit 201 may not make determinations on the angle ranges 6 and 7 without referring to the touch screen direction in addition to the determinations on the angle ranges 2 to 5. Further, the mode determination unit 201 may omit the above-mentioned screen control.

Further, the mode determination unit 201 may determine the stand mode, the tent mode, and the tablet mode as the tablet mode without distinguishing among them. In this case, the mode determination unit 201 does not have to determine the touch screen direction.

While the embodiment of this invention has been described in detail above with reference to the accompanying drawings, the specific structure/configuration is not limited to the above-mentioned embodiment, and design changes shall be included without departing from the scope of this invention. Further, respective components described in the above-mentioned embodiment can be combined arbitrarily unless there is a contradiction.

For example, instead of the EC 171, the CPU 151 may read the control program prestored in the HDD 161 and execute the read control program to implement the functions of the mode determination unit 201, the output control unit 203, the control table 215, and the control register 217.

DESCRIPTION OF SYMBOLS 10, 10a, 10b . . . information processing apparatus, 101 . . . first chassis, 103 . . . touch screen, 105 . . . second chassis, 107 . . . keyboard, 109 . . . touch pad, 121a, 121b . . . hinge mechanism, 151 . . . CPU, 153 . . . GPU, 155 . . . system memory, 157 . . . audio device, 159 . . . communication module, 161 . . . HDD, 163 . . . I/O controller, 171 . . . EC, 173 . . . proximity sensor, 175a, 175b . . . acceleration sensor, 177 . . . input device, 179 . . . Hall sensor, 189 . . . DC/DC converter, 191 . . . power supply unit, 201 . . . mode determination unit, 203 . . . output control unit, 215 . . . control table, 217 . . . control register, SD . . . system device.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An information processing apparatus, comprising:
a capacitor;
a communication unit which communicates with other devices wirelessly;
a detection unit that detects a physical quantity varying with the approach of an object, the physical quantity comprising a capacitance of the capacitor;
a control unit which causes the communication unit to reduce output of radio waves when the amount of change in physical quantity exceeds a predetermined threshold value;
a first chassis on which the communication unit and the detection unit are mounted; and
a predetermined member placed at least in either a position to approach the first chassis or a position to separate from the first chassis, wherein the predetermined member is the object, wherein, in response to the predetermined member being in the position to approach the first chassis, the detection unit obtains, in advance, an amount of change in capacitance caused by the predetermined member being in the position to approach the first chassis from a previous position and the control unit corrects the threshold value based on the obtained change in capacitance detected by the detection unit due to the approach of the predetermined member, and wherein in response to the predetermined member being in the position to separate from the first chassis, the control unit cancels the correction based on the obtained change in capacitance.

2. The information processing apparatus according to claim 1, wherein the predetermined member is a second chassis different from the first chassis.

3. The information processing apparatus according to claim 2, wherein the information processing apparatus further comprises a rotating mechanism which makes the first chassis rotatable with respect to the second chassis while coupling the first chassis and the second chassis.

4. The information processing apparatus according to claim 3, wherein based on an angle between the first chassis and the second chassis, the control unit determines whether the position of the second chassis is the position to approach the first chassis or the position to separate from the first chassis.

5. The information processing apparatus according to claim 1, further comprising:
a display unit which displays visual information on a surface of one of the first chassis and the second chassis; and
an operation input unit provided on the other of the first chassis and the second chassis to accept operations,
wherein the control unit determines that the second chassis is in the position to approach the first chassis in response to a direction of the display unit is a direction opposite to a direction of the operation input unit.

6. The information processing apparatus according to claim 1, wherein the communication unit is communicable with other devices via a public wireless communication network.

7. The information processing apparatus according to claim 1, further comprising an acceleration sensor that generates acceleration signals for determining an angle between the predetermined member and the first chassis, the threshold value further determined based on the determined angle.

8. The information processing apparatus according to claim 7, wherein a use mode of the information processing apparatus is determined based on the determined angle between the predetermined member and the first chassis, the threshold value further determined based on the determined use mode.

9. The information processing apparatus according to claim 8, wherein the determined angle is cross-referenced with a predefined table of angle ranges that corresponds to a use mode.

10. The information processing apparatus according to claim 9, wherein a predefined adjustment range is used to give hysteresis upon transition to an adjacent angle range in response to a change in the determined angle.

11. A method, comprising:
causing a communication unit to reduce output of radio waves when an amount of change in physical quantity exceeds a predetermined threshold value, the communication unit configured to wirelessly communicate with other devices, the physical quantity comprising a capacitance of a capacitor; and in response to a predetermined member placed in a position to approach a first chassis, on which the communication unit and a detection unit are mounted, obtaining, in advance, an amount of change in capacitance caused by the predetermined member being in the position to approach the first chassis from a previous position and correcting the threshold value based on the obtained change in capacitance detected by the detection unit due to the approach of the predetermined member, the detection unit configured to detect a physical quantity varying with the approach of the predetermined member; and in response to the predetermined member placed in a position to separate from the first chassis, cancelling the correction based on the obtained change in capacitance.

12. The method of claim 11, wherein the predetermined member is a second chassis different from the first chassis.

13. The method of claim 12, wherein the first chassis is rotatable with respect to the second chassis by a rotating mechanism that couples the first chassis and the second chassis.

14. The method of claim 13, further comprising determining, by the control unit, whether the position of the second chassis is the position to approach the first chassis or the position to separate from the first chassis based on an angle between the first chassis and the second chassis.

15. The method of claim 11, further comprising determining, by the control unit, that the second chassis is in the position to approach the first chassis in response to a direction of a display unit being in a direction that is opposite to a direction of an operation input unit, the display unit configured to display visual information on a surface of one of the first chassis and the second chassis, the operation input unit provided on the other of the first chassis and the second chassis and configured to accept operations.

16. The method of claim 11, further comprising determining an angle between the predetermined member and the first chassis based on acceleration signals generated by an acceleration sensor, the threshold value further determined based on the determined angle.

17. The method of claim 16, further comprising determining a use mode of the information processing apparatus based on the determined angle between the predetermined member and the first chassis, the threshold value further determined based on the determined use mode.

18. The method of claim 17, wherein the determined angle is cross-referenced with a predefined table of angle ranges that corresponds to a use mode.

19. The method of claim 18, wherein a predefined adjustment range is used to give hysteresis upon transition to an adjacent angle range in response to a change in the determined angle.

20. A system, comprising:
a capacitor;
a first chassis;
a second chassis coupled to the first chassis by a rotating mechanism;
a communication unit which communicates with other devices wirelessly;
a detection unit that detects a physical quantity varying with the approach of the second chassis, the physical quantity comprising a capacitance of the capacitor;

a control unit which causes the communication unit to reduce output of radio waves when the amount of change in physical quantity exceeds a predetermined threshold value;

a display unit on a surface of a first chassis on which the communication unit and the detection unit are mounted;

an operation input unit provided on the second chassis to accept operations; and, wherein, in response to the second chassis being in the position to approach the first chassis, the detection unit obtains, in advance, an amount of change in capacitance caused by the second chassis being in the position to approach the first chassis from a previous position and the control unit corrects the threshold value based on the obtained change in capacitance detected by the detection unit due to the approach of the second chassis, and wherein in response to the second chassis being in the position to separate from the first chassis, the control unit cancels the correction based on the obtained change in capacitance.

* * * * *